United States Patent
Satoji et al.

(10) Patent No.: US 8,591,113 B2
(45) Date of Patent: Nov. 26, 2013

(54) FLUID DYNAMIC BEARING DEVICE

(75) Inventors: Fuminori Satoji, Kuwana (JP); Toshiyuki Mizutani, Kuwana (JP); Tetsuya Yamamoto, Kuwana (JP); Isao Komori, Kuwana (JP); Tetsuya Kurimura, Kuwana (JP)

(73) Assignee: NTN Corporation, Osaka (JP)

( * ) Notice: Subject to any disclaimer, the term of this patent is extended or adjusted under 35 U.S.C. 154(b) by 340 days.

(21) Appl. No.: 12/997,784

(22) PCT Filed: Jun. 11, 2009

(86) PCT No.: PCT/JP2009/060678
§ 371 (c)(1),
(2), (4) Date: Dec. 13, 2010

(87) PCT Pub. No.: WO2010/004828
PCT Pub. Date: Jan. 14, 2010

(65) Prior Publication Data
US 2011/0097025 A1 Apr. 28, 2011

(30) Foreign Application Priority Data

Jul. 8, 2008 (JP) .................................. 2008-178379
Jul. 29, 2008 (JP) .................................. 2008-195233

(51) Int. Cl.
*F16C 32/06* (2006.01)
(52) U.S. Cl.
USPC .......................................... 384/100; 384/107
(58) Field of Classification Search
USPC ......... 384/100, 105, 107, 114, 120, 123, 130, 384/606
See application file for complete search history.

(56) References Cited

U.S. PATENT DOCUMENTS 5,634,724 A * 6/1997 Zang et al. ..................... 384/107
6,267,567 B1 * 7/2001 Hsieh ............................ 417/354
(Continued)

FOREIGN PATENT DOCUMENTS

| JP | 2003-336636 A | 11/2003 |
| JP | 2004108549 A * | 4/2004 |

(Continued)

OTHER PUBLICATIONS

Notification of Transmittal of Translation of the International Preliminary Report on Patentability (Form PCT/IB/338) of International Application No. PCT/JP2009/060678 mailed Feb. 17, 2011 with Forms PCT/IB/373 and PCT/ISA/237.

(Continued)

*Primary Examiner* — Marcus Charles
(74) *Attorney, Agent, or Firm* — Westerman, Hattori, Daniels & Adrian, LLP

(57) ABSTRACT

A fluid dynamic bearing device includes: a shaft member; a bearing sleeve which forms a radial bearing gap between the bearing sleeve and an outer peripheral surface of the shaft member; a housing which accommodates the bearing sleeve and is opened at both ends; and a lid member which closes an opening on one end side of the housing and forms thrust bearing portions. The housing is an injection-molded product into which the bearing sleeve is inserted, and the housing has another end with which a seal portion forming a seal space is integrally formed. The lid member is fitted with the outer peripheral surface of the housing by loose fitting so that the lid member and the housing are bonded and fixed to each other.

10 Claims, 11 Drawing Sheets

(56) References Cited

U.S. PATENT DOCUMENTS

| | | | |
|---|---|---|---|
| 6,720,694 B2* | 4/2004 | Horng et al. | 310/90 |
| 7,059,771 B2* | 6/2006 | Gomyo et al. | 384/100 |
| 7,073,944 B2* | 7/2006 | Aiello et al. | 384/107 |
| 7,510,331 B2* | 3/2009 | Hong et al. | 384/119 |
| 7,776,802 B2* | 8/2010 | Hirata et al. | 384/107 |
| 8,197,141 B2* | 6/2012 | Yamamoto et al. | 384/107 |
| 2003/0231813 A1* | 12/2003 | Gomyo et al. | 384/107 |
| 2004/0013329 A1* | 1/2004 | Yamashita et al. | 384/100 |
| 2007/0025652 A1 | 2/2007 | Satoji et al. | |
| 2007/0140604 A1* | 6/2007 | Shishido et al. | 384/100 |
| 2008/0152270 A1* | 6/2008 | Engesser et al. | 384/107 |
| 2009/0129710 A1* | 5/2009 | Ito et al. | 384/107 |
| 2010/0239196 A1 | 9/2010 | Yamamoto et al. | |

FOREIGN PATENT DOCUMENTS

| | | | |
|---|---|---|---|
| JP | 2006097735 A | * | 4/2006 |
| JP | 2006105332 A | * | 4/2006 |
| JP | 2007-192325 A | | 8/2007 |
| JP | 2007-327588 A | | 12/2007 |
| WO | 2004/092600 A1 | | 10/2004 |
| WO | 2007/141940 A1 | | 12/2007 |

OTHER PUBLICATIONS

International Search Report of PCT/JP2009/060678, mailing date Sep. 15, 2009.

* cited by examiner

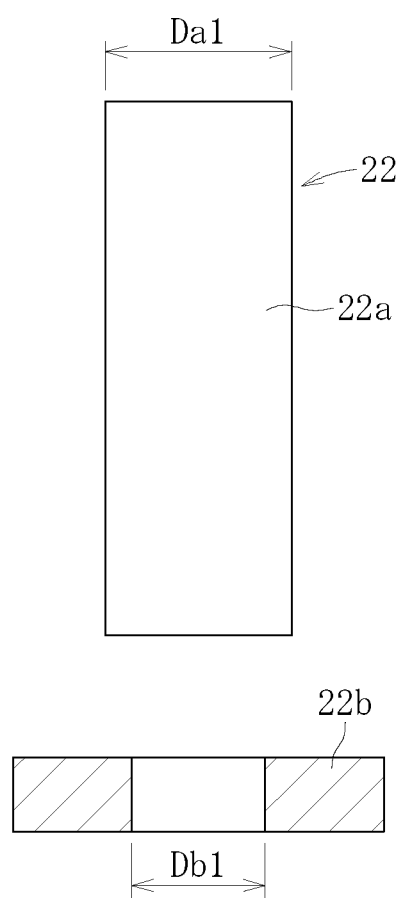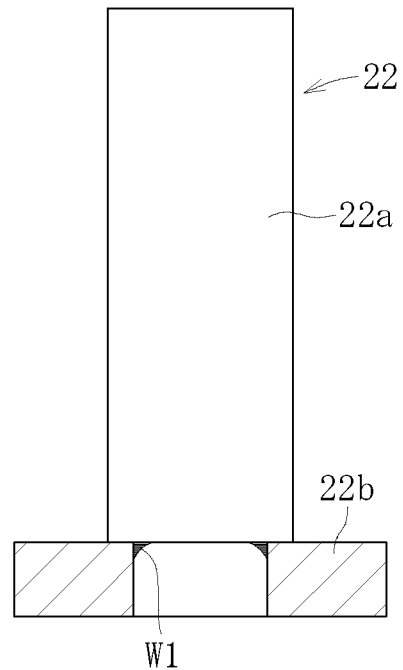

FLUID DYNAMIC BEARING DEVICE

CROSS-REFERENCE TO RELATED APPLICATIONS

The present application claims priority under 35 U.S.C. §119 to Japanese Patent Application No. 2008-178379, filed Jul. 8, 2008, and Japanese Patent Application No. 2008-195233 filed Jul. 29, 2008, and is a National Stage application under 35 U.S.C. §371 of international application PCT/JP2009/060678, filed Jun. 11, 2009, the contents of all of which are incorporated herein by reference, in their entirety.

TECHNICAL FIELD

The present invention relates to a fluid dynamic bearing device rotatably supporting a shaft member with a fluid film generated in a radial bearing gap facing an outer peripheral surface of the shaft member.

BACKGROUND ART

Due to its high rotational precision and calmness, a fluid dynamic bearing device is used in a spindle motor for a magnetic disk drive of an information apparatus (HDD, for example), an optical disk drive for a CD, DVD, Blu-ray or the like, or a magneto-optical disk drive for an MD, MO or the like, a polygon scanner motor of a laser beam printer (LBP), a projector color wheel motor, or a small motor such as a fan motor for cooling an electrical apparatus or the like.

For example, Patent Document 1 discloses a fluid dynamic bearing device including a shaft member, a bearing sleeve having an inner periphery along which the shaft member is inserted, a cylindrical housing having an inner periphery retaining the bearing sleeve, a lid member closing one opening of the housing, and a seal member forming a seal space. The lid member is fixed to an inner peripheral surface of the housing by an appropriate means such as bonding, press-fitting, and caulking.

[Patent Document 1] JP 2003-336636 A

SUMMARY OF THE INVENTION

Problem to be Solved by the Invention recently, with expanded application of a fluid dynamic bearing device, there is a tendency that needs for improvements with respect thereto are diversified. Examples thereof include an improvement in retention strength of a lid member. There is a risk that, when an impact load is applied to the fluid dynamic bearing device, an end portion of the shaft member abuts the lid member, whereby the impact at this time causes the lid member to be broken or detached. In particular, when a plurality of disks are mounted for the purpose of increasing capacity of an HDD or the like, a weight on the shaft member side is increased to thereby increase the impact applied to the lid member. Therefore, the high retention strength is required for the lid member. When the lid member is fixed to the inner peripheral surface of the housing as in the fluid dynamic bearing device of Patent Document 1 described above, an increase in thickness of the lid member causes a fixation area between the housing and the lid member to be expanded. As a result, it is possible to enhance fixation strength of the lid member, thereby possible to make the lid member less likely to be detached from the housing. However, the increase in thickness of the lid member causes expansion in axial dimension of the bearing device and reduction in bearing span of the radial bearing portion, and hence the lid member cannot be increased in thickness more than necessary.

The main object of the present invention is to improve, in the fluid dynamic bearing device of this type, retention strength of the lid member without increase in size and reduction in bearing property thereof.

Means for Solving the Problems

As a first structure for solving the above-mentioned problem, the present invention provides a fluid dynamic bearing device, comprising: a shaft member; a bearing sleeve which forms a radial bearing gap with an outer peripheral surface of the shaft member; a housing which accommodates the bearing sleeve and is opened at both ends; and a lid member which closes an opening on one end side of the housing and forms a thrust bearing portion, wherein: the housing is an injection-molded product into which the bearing sleeve is inserted; the housing has another end with which a seal portion forming a seal space is integrally formed; and the lid member is fixed to an outer peripheral surface of the housing.

The lid member is fixed to the outer peripheral surface of the housing, and hence it is possible to increase, in comparison with a case of fixing the lid member to the inner peripheral surface of the housing, the fixation area correspondingly to the radial difference between the inner peripheral surface and the outer peripheral surface. When the lid member is to be fixed to the outer peripheral surface of the housing, a portion closing the opening (refer to plate portion 10a of FIG. 2, for example) and a cylindrical portion fixed to the outer peripheral surface (refer to cylindrical portion 10b of FIG. 2, for example) are required. However, what is necessary for expanding the fixation area of both the portions is only to extend axially the cylindrical portion to be fixed, to thereby expand contact area between the lid member and the outer peripheral surface of the housing. Therefore, it is unnecessary to increase thickness of the lid member. Further, extension of the cylindrical portion does not affect axial dimension of the entire bearing device. As a result, it is possible to improve retention strength of the lid member without affecting the axial dimension of the bearing device and the bearing span of the radial bearing portion.

Further, recently, there is a tendency that needs for cost reduction of the fluid dynamic bearing device become increasingly strict. In this regard, the housing is the injection-molded product made by inserting the bearing sleeve thereinto, and hence molding of the housing and fixation of the housing and the bearing sleeve are completed within one step. Therefore, compared with the case in which both the members are fixed by an appropriate means after being manufactured separately, the number of steps is reduced, whereby it is possible to achieve cost reduction of the fluid dynamic bearing device.

In addition, the lid member fixed to the outer peripheral surface of the housing is used as an attachment portion with respect to a member constituting a base of a motor, such as a motor bracket. For example, in the case of molding a member corresponding to the lid member integrally with the housing, a resin is frequently used in terms of moldability. However, when a member made of the resin is bonded and fixed to the motor bracket (usually made of metal), it is difficult to ensure fixation strength. In contrast, as in the invention of the present application, in the structure of using the lid member as the attachment portion with respect to the motor bracket, it is possible to form the housing of a material having excellent moldability (resin, for example) while the lid member is made of a material having excellent adhesiveness (metal, for example) with respect to the motor bracket, thereby possible to ensure both moldability and fixation strength.

As a second structure for solving the above-mentioned problem, the present invention provides a fluid dynamic bearing device, comprising: a shaft member; a bearing sleeve which forms a radial bearing gap with an outer peripheral surface of the shaft member; a housing which accommodates the bearing sleeve and is opened at both ends; and a lid member which closes an opening on one end side of the housing and forms a thrust bearing portion, wherein: the housing is an injection-molded product into which the bearing sleeve is inserted; the housing has another end with which a seal portion forming a seal space is integrally formed; and the lid member and the housing are made of materials different from each other.

In this case also, the housing is an injection-molded product made by inserting the bearing sleeve thereinto, and hence molding of the housing and fixation of the housing and the bearing sleeve are completed within one step. Therefore, compared with the case in which both the members are fixed by an appropriate means after being manufactured separately, the number of steps is reduced, whereby it is possible to achieve cost reduction of the fluid dynamic bearing device.

Further, by making the lid member and the housing with use of materials different from each other, it is possible to form the lid member and the housing of materials each conforming to characteristics required for each member, and hence a degree of freedom in design of the bearing device is increased. For example, when the portions corresponding to the housing and the lid member are integrally injection-molded as described above, the moldability is an important factor in selecting a material. However, in addition, the housing is required to have strength, adhesiveness with respect to the bracket, conductivity, and the like. In consideration of cost, it is difficult to satisfy all these demanded characteristics with a single material. In contrast, when the housing and the lid member are made of materials different from each other, it is possible to form the housing of the material having excellent moldability while the lid member is made of a material which is superior in strength, conductivity, and adhesiveness, whereby it is possible to satisfy the above-mentioned demanded characteristics. In this case, as a representative example of a case of using "different materials", there can be exemplified a case of making one of the housing and the lid member with use of a resin material, and the other of a metal material. As long as the materials different in chemical composition, both the members may be made of resin materials or metal materials. As the "different materials" in the case of making both the members of with use of the resin materials, materials having different base resins can be exemplified.

In the above-mentioned structure, it is preferable for the conductivity (inverse number of specific electric resistance) of the resin member to be larger than the conductivity of the housing. Generally, in a disk drive such as an HDD, static electricity is charged between a disk and a head, and hence it is desirable that the static electricity be discharged to the motor bracket on a ground side through the bearing device. In this case, the housing serving as a conductive path is required to have conductivity. However, as described above, it is difficult to ensure both moldability and conductivity of the housing. In contrast, by making the lid member with use of a material having conductivity larger than that of the housing, it is possible to ensure the conductive path through an intermediation of the lid member while eliminating the need for the conductivity of the housing. Therefore, as a material of the housing, it is possible to select a material conforming only to the characteristic required for the housing (moldability), thereby expanding a range of choice of the material.

By covering with the housing at least the outer peripheral chamfer on the one end side (side closed by lid member) of the bearing sleeve, it is possible to achieve detachment prevention of the bearing sleeve. This effect can be obtained more remarkably by covering the end surface on the one end side of the bearing sleeve with the housing.

When the end surface on the one end side of the bearing sleeve is covered with the housing, a thrust dynamic pressure generating portion such as dynamic pressure grooves can be formed on the end surface of the covered portion. As a result, it is possible to constitute the thrust bearing portion by the fluid dynamic bearing. The thrust dynamic pressure generating portion can be formed simultaneously with the injection molding of the housing, which eliminates a need for forming the thrust dynamic pressure generating portions in separate steps, thereby simplifying the manufacturing step of the bearing device.

In the above-mentioned structure, provision of the flange portion to the shaft member and formation of the thrust bearing gaps between the end surface of the bearing sleeve and the one end surface of the flange portion and between the lid member and the other end surface of the flange portion enable the thrust bearing portions to be constituted in the fluid dynamic bearing.

In this case, when axial gaps allowing an axially-approaching movement of the housing and the lid member until the thrust bearing gaps are eliminated are interposed between the housing and the lid member, it is possible to set the thrust bearing gaps of the thrust bearing portions with high accuracy. In this case, if the lid member is moved by a predetermined amount in a state in which widths of the thrust bearing gaps are zero in a direction of separating from the bearing sleeve (with this movement, the axial gaps are formed between the housing and the lid member), the thrust bearing gaps can be set to have specific widths. According to this method, it is possible to set the widths of the thrust bearing gaps by a movement amount of the lid member without depending on accuracy of the members, whereby it is possible to relax restriction on working accuracy, and hence the working cost can be reduced.

As a third structure for solving the above-mentioned problem, the present invention provides a fluid dynamic bearing device, comprising: a shaft member; an outer member which is arranged on a radially outer side of the shaft member and is opened at both ends; a radial bearing gap which is formed on a radially inner side of the outer member and faces an outer peripheral surface of the shaft member; and a lid member closing an opening on one end side of the outer member, wherein the lid member is fitted to an outer peripheral surface of the outer member with a fastening allowance which does not affect accuracy of a surface defining an outer diameter dimension of the radial bearing gap so that the outer member and the lid member are bonded and fixed to each other.

Note that, in the case of forming the radial bearing gap between an inner peripheral surface 28a of a bearing sleeve 28 and an outer peripheral surface of a shaft member 22 (refer to FIG. 9), a housing 29 accommodating the bearing sleeve 28 in an inner periphery thereof constitutes the "outer member", and the inner peripheral surface 28a of the bearing sleeve 28 constitutes the "surface defining an outer diameter dimension of the radial bearing gap". In the case of integrating the housing and the bearing sleeve as one component, and forming the radial bearing gap between the inner peripheral surface of the integrated component and the outer peripheral surface of the shaft member 22 (refer to FIG. 17), the integrated product 29 constitutes the "outer member", and the inner peripheral surface of the outer member 29 constitutes the "surface defining outer diameter dimension of the radial bearing gap".

The lid member is fixed to the outer peripheral surface of the outer member in this case also, and hence it is possible to increase, in comparison with the case of fixing the lid member to the inner peripheral surface of the outer member, the fixation area correspondingly to the radial difference between the inner peripheral surface and the outer peripheral surface. What is necessary for further increasing the fixation area between both the members is only to axially extend a portion of the lid member, which is to be fitted to the outer peripheral surface of the outer member, to thereby expand the contact area between the lid member and the outer peripheral surface of the outer member. In this case, it is unnecessary to increase thickness of the lid member, and there is no effect on the axial dimension of the entire bearing device even when the portion to be fitted to the outer peripheral surface of the outer member is axially extended. As a result, it is possible to improve retention strength of the lid member without affecting the axial dimension of the bearing device and the bearing span of the radial bearing portion.

In addition, the lid member fixed to the outer peripheral surface of the outer member is used as an attachment portion with respect to a metal base member arranged along the outer periphery thereof. In this case, the lid member is fixed not only to the outer member but also to the base member, and hence the retention strength of the lid member can be improved. In particular, in the case of molding the outer member with a resin or the like in view of the cost reduction, it is difficult to ensure fixation strength during bonding and fixation of the outer member with respect to the base resin (usually made of metal). However, as in the invention of the present application, by using the lid member as the attachment portion with respect to the base member, it is possible to form the outer member of a resin or the like while the lid member is made of a material having excellent adhesiveness with respect to the base member (metal, for example). As a result, it is possible to ensure both moldability of the outer member and attachment strength with respect to the base member of the fluid dynamic bearing device.

In the case of attaching the lid member by being fitted to the outer peripheral surface of the outer member, it is necessary to devise the attaching method therefor. For example, when both the member are fixed by press-fitting with a large press-fit allowance, there is a risk that deformation of the outer member caused by the press-fitting reaches the radially inner side thereof, thereby reducing accuracy of the surface defining outer diameter dimension of the radial bearing gap to deteriorate the bearing performance of the radial bearing portion. This problem becomes obvious particularly when the radial dynamic pressure generating portions are provided to the surface defining the radial bearing gap and the inner peripheral surface of the cylindrical portion of the lid member is overlapped partially or entirely with the radial dynamic pressure generating portions in the axial direction.

In this regard, in the present invention, the lid member is fitted to the outer peripheral surface of the outer member with a fastening allowance which does not affect the accuracy of the surface defining the outer diameter dimension of the radial bearing gap, to thereby bonding and fixing the lid member and the outer member to each other. As a result, it is possible to avoid deterioration in bearing performance of the radial bearing portion while reliably sealing the opening of the outer member. The bonding and fixation between the lid member and the outer member can be performed by interposing the adhesive between the inner peripheral surface of the lid member and the outer peripheral surface of the outer member. The "fastening allowance which does not affect the surface accuracy" includes a state of light press-fitting with the plus fastening allowance, a state with no fastening allowance, and a state of loose fitting with minus fastening allowance. The "loose fitting" refers to a state in which the gap is inevitably generated between the shaft and the hole even under the assumption of dimensional tolerance (JIS B0401).

In this case, the description "not affecting the surface accuracy of the surface" means that, after the lid member is fitted to the outer member, circularity of a surface defining the outer diameter dimension of the radial bearing gap in arbitrary radial section (for example, radial section passing the pressure generating portion of the radial dynamic pressure generating portion of the surface) is 2.0 μm or less.

The above-mentioned operational effects can be similarly obtained in a fluid dynamic bearing device comprising: a shaft member; an outer member which is arranged on a radially outer side of the shaft member and is opened at both ends; a radial bearing gap which is formed on a radially inner side of the outer member and faces an outer peripheral surface of the shaft member; and a lid member closing an opening on one end side of the outer member, wherein the lid member is fitted to an outer peripheral surface of the outer member by loose fitting so that the outer member and the lid member are bonded and fixed to each other (in the following, the fluid dynamic bearing device structured as described above is also referred to as a "fourth structure").

In this case, by partially or entirely filling the radial gap formed by the loose fitting with the adhesive and curing the gap, the lid member can be bonded and fixed to the outer member (sometimes referred to as "loose bonding").

The lid member includes a plate portion and a cylindrical portion to be fitted to the outer peripheral surface of the outer member. The plate portion of the lid member can constitute the thrust bearing portion including a pivot bearing or the fluid dynamic bearing. Examples of the pivot bearing include one having a structure in which the end portion of the shaft member is brought into sliding-contact with the plate portion. Further, examples of the fluid dynamic bearing include one having a structure in which the flange portion is provided to the shaft member, and the thrust bearing gaps are formed between the one end surface of the flange portion and a surface facing thereto in the axial direction (end surface of the bearing sleeve and end surface of the outer member), and between the other end surface of the flange portion and the plate portion of the lid member.

In the above-mentioned third and fourth structures, it is desirable that a first radial gap be provided between an inner peripheral surface of the cylindrical portion of the lid member and the outer peripheral surface of the outer member, and that a first axial gap be provided between an end surface of the cylindrical portion of the lid member and the outer member facing the end surface. In this case, by sealing the first axial gap with the adhesive, it is possible to reliably prevent oil leakage through a boundary surface between the lid member and the outer member.

It is desirable that a width $\delta 11$ of the first axial gap and a width $\epsilon 11$ of the first radial gap have a relationship of $\delta 11 > \epsilon 11$. With this, by supplying the adhesive in the first axial gap, it is possible to draw the adhesive into the narrower first radial gap by a capillary force. Consequently, the adhesion strength can be reinforced, and a sealing effect between the outer member and the lid member becomes more reliable. Note that, the "width of the radial gap" means a value obtained by subtracting a radial dimension of the outer peripheral surface of the radially inner side member from a radial dimension of the inner peripheral surface of the radially outer side member of the two members fitted to each other (the same is true hereinafter).

Further, when a second axial gap is provided between the plate portion of the lid member and the outer member facing the plate portion, and the relationship between the a width $\delta 12$ of the second axial gap and the width $\epsilon 11$ of the first radial gap is set to be $\delta 12 > \epsilon 11$, the adhesive interposed in the first radial gap is less likely to be drawn into the second axial gap by the capillary force. As a result, it is possible to prevent leakage of the adhesive to the thrust bearing portion adjacent to the second axial gap.

When a base member constituting a motor base is arranged along the outer periphery of the outer member, the following gaps can be formed: a first axial gap between the end surface of the cylindrical portion of the lid member and the outer member facing the end surface; a second axial gap between the plate portion of the lid member and the outer member facing the plate portion; a first radial gap between the inner peripheral surface of the cylindrical portion of the lid member and the outer peripheral surface of the outer member; a second radial gap between the outer peripheral surface of the lid member and the inner peripheral surface of the base member; and a third radial gap between the outer peripheral surface of the outer member and the inner peripheral surface of the base member.

The lid member and the base member may be fixed to each other by so-called gap-filling bonding in which both the members are bonded to each other by filling the second radial gap being interposed therebetween. When the lid member and the base member is fixed by press-fitting, there is a risk that deformation of the lid member caused by the press-fitting spreads also to the surface defining the outer diameter dimension of the radial bearing gap via the outer member. However, this type of problem can be avoided in the gap-filling bonding. When the outer member and the base member are subjected to gap-filling bonding in which the third radial gap being interposed therebetween is filled in addition to gap-filling bonding of the lid member and the base member, fixation strength with respect to the base member of the fluid dynamic bearing device is further enhanced.

In this case, at least one of the first axial gap, the second axial gap, the first radial gap, the second radial gap, and the third radial gap has a width different from that of others.

When the relationship between a width $\epsilon 12$ of the second radial gap and a width $\epsilon 13$ of the third radial gap is $\epsilon 12 > \epsilon 13$, the lid member does not interfere with the base member in inserting an assembly including the shaft member, the outer member, and the lid member along the inner periphery of the base member, and hence the assembly can be smoothly inserted along the inner periphery of the base member.

When the diameter of the outer peripheral surface of the outer member facing the third radial gap is made larger than that of the outer peripheral surface of the lid member, and the relationship between a difference z1 in radial dimension between both the outer peripheral surfaces and the width $\epsilon 11$ of the first radial gap is $z1 > \epsilon 11$, it is possible to reliably prevent, even when the lid member and the outer member are fixed in an eccentric state (for example, when the inner peripheral surface of the lid member and the outer peripheral surface of the outer member are brought into contact with each other at a partial region in the circumferential direction), the lid member from interfering with base member in inserting the assembly along the inner periphery of the base member, thereby improving workability.

In the above-mentioned fluid dynamic bearing devices having any structure as described above, manufacturing cost of the lid member can be reduced by press-molding the lid member, and hence the increase in manufacturing cost of the bearing device can be suppressed.

Effect of the Invention

As described above, according to the present invention, it is possible to improve retention strength of the lid member without increasing size of the bearing device and deteriorating bearing performance. With the third and fourth structures in particular, when the lid member is fixed to the outer member, accuracy of the surface defining the outer diameter dimension of the radial bearing gap is not deteriorated, and deterioration in bearing performance of the radial bearing portion can be avoided. Further, it is possible to achieve cost reduction of the fluid dynamic bearing device.

BRIEF DESCRIPTION OF THE DRAWINGS

FIG. 16A is a sectional view illustrating an unassembled state of a shaft member according to another structural example.
FIG. 16B is a sectional view illustrating an assembled state of the shaft member according to the another structural example.

DETAILED DESCRIPTION OF THE INVENTION

In the following, embodiments of the present invention are described with reference to the figures.

Figure 1:
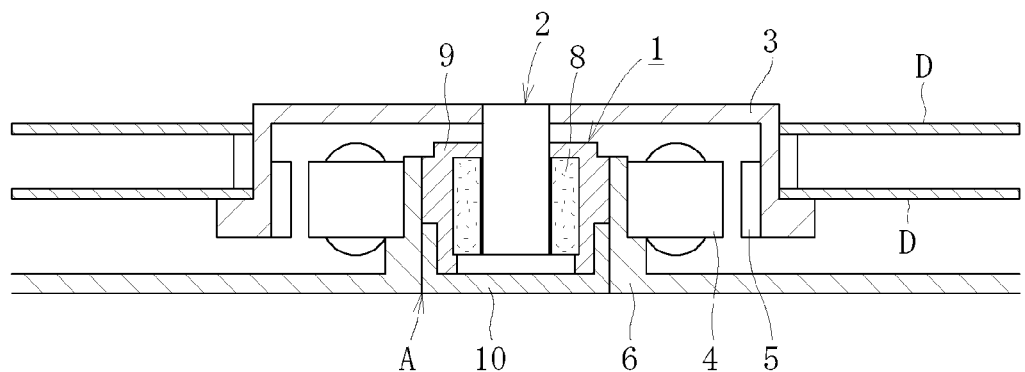
FIG. 1 is a sectional view of a spindle motor.
Figure 2:
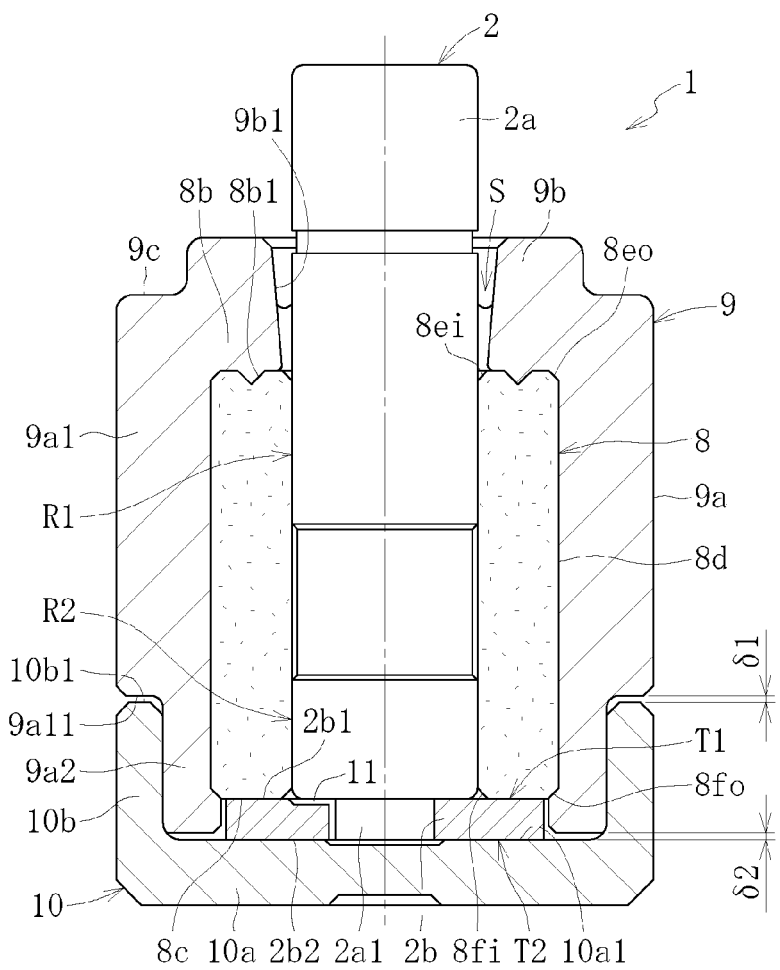
FIG. 2 is a sectional view of a fluid dynamic bearing device according to a first embodiment of the present invention.

FIG. 1 conceptually illustrates a construction example of a spindle motor for an information apparatus incorporating a fluid dynamic bearing device 1 illustrated in FIG. 2. The spindle motor is used for a disk drive such as an HDD, and includes the fluid dynamic bearing device 1 for rotatably supporting a shaft member 2, a disk hub 3 fixed to the upper end portion of the shaft member 2, a stator coil 4 and a rotor magnet 5 opposed to each other through an intermediation of a gap (radial gap in the illustrated example), and a motor bracket 6 as a base member. The stator coil 4 is mounted to the outer periphery of the motor bracket 6, and the rotor magnet 5 is attached to the inner periphery of the disk hub 3. The fluid dynamic bearing device 1 is fixed to the inner periphery of the motor bracket 6. One or multiple (two in this embodiment) disks D1 as information recording media are held on the disk hub 3, and fixed by a clamping device (not shown). The rotor magnet 5 is rotated when the stator coil 4 is energized, and in accordance therewith, the disk hub 3 and disks D1 held on the disk hub 3 are integrally rotated with the shaft member 2.

FIG. 2 illustrates the fluid dynamic bearing device 1 according to the first embodiment of the present invention. The fluid dynamic bearing device 1 illustrated in FIG. 2 includes the shaft member 2, a bearing sleeve 8 having the shaft member 2 inserted along the inner periphery thereof, a housing 9 opened at both axial ends and accommodating the bearing sleeve 8, and a lid member 10 for closing an opening on one end side in the axial direction (lower end side in the illustrated example) of the bearing sleeve 8. Note that, in the following, for the sake of convenience in illustration, in the axial direction of the housing 9, the side closed by the lid member 10 is referred to as a lower side, and the side opposite thereto is referred to as an upper side.

The shaft member 2 includes a shaft portion 2a and a flange portion 2b. The shaft portion 2a and the flange portion 2b are made of metal material excellent in abrasion resistance, such as stainless steel. A small diameter portion 2a1 is formed at the lower end of the shaft portion 2a, and the shaft member 2 is formed by fitting and fixing the small diameter portion 2a1 to the inner periphery of the flange portion 2b of a perforated-disk shape. The fixing method for the shaft portion 2a and the flange portion 2b is arbitrary, and hence, in addition to press-fitting and bonding, welding (particularly, laser welding) or the like may be adopted. The shaft portion 2a and the flange portion 2b integrally molded by forging or the like may be used as the shaft member 2.

Figure 3:
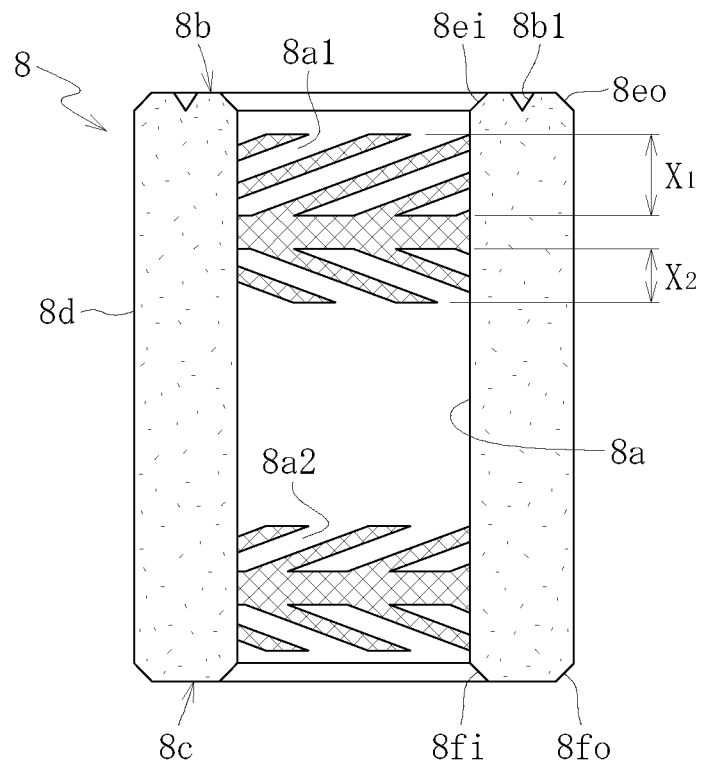
FIG. 3 is a sectional view of a bearing sleeve illustrated in FIG. 2.

As illustrated in FIG. 3, the bearing sleeve 8 is formed into a cylindrical shape with use of a sintered metal, for example, a porous body containing copper as a main component. Alternatively, the bearing sleeve 8 may be made of another metal, a resin, ceramic, or the like. An inner peripheral surface 8a and an outer peripheral surface 8b of the bearing sleeve 8 are formed as cylindrical surfaces uniform in radial dimension in the axial direction. Further, on the radially inner end and the radially outer end of both the axial ends of the bearing sleeve 8, chamfers 8ei, 8fi, 8eo, and 8fo are formed, respectively.

In the inner peripheral surface 8a of the bearing sleeve 8, there are formed radial dynamic pressure generating portions for generating a dynamic pressure effect in the fluid film (oil film) in the radial bearing gaps. In this embodiment, as illustrated in FIG. 3, two dynamic pressure groove regions in which herringbone dynamic pressure grooves 8a1 and 8a2 are arranged are formed while being axially separated from each other. Of the two dynamic pressure groove regions, cross-hatched portions excluding dynamic pressure grooves 8a1 and 8a2 constitute a hill portions. In the upper radial dynamic pressure groove region, the dynamic pressure grooves 8a1 are formed asymmetrically in the axial direction, specifically, with respect to a belt-like portion formed on the substantially central portion in the axial direction of the hill portion, an axial dimension X1 of the upper grooves is larger than an axial dimension X2 of the lower grooves (X1>X2). In the lower radial dynamic pressure groove region, the dynamic pressure grooves 8a2 are formed asymmetrically in the axial direction. Owing to an imbalance of pumping capacities of the radial dynamic pressure generating portions described above, when the shaft member 2 is rotated, the lubricating oil filling the gap between the inner peripheral surface 8a of the bearing sleeve 8 and the outer peripheral surface of the shaft portion 2a is pressed downward.

Figure 4:
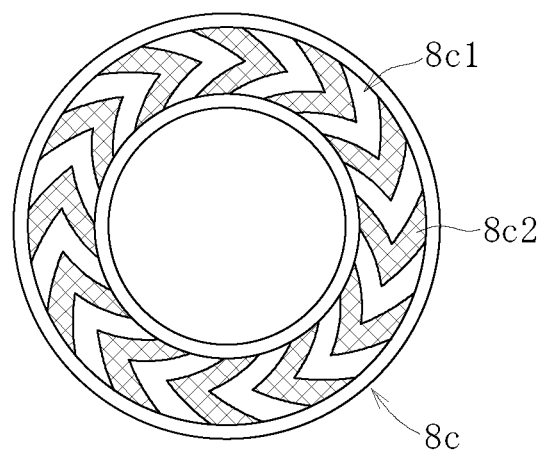
FIG. 4 is a bottom view of the bearing sleeve illustrated in FIG. 2.

On a lower end surface 8c of the bearing sleeve 8, there is formed a thrust dynamic pressure generating portion for generating a dynamic pressure effect in the oil film in the thrust bearing gap. As illustrated in FIG. 4, the thrust dynamic pressure generating portion is formed in a herringbone pattern in which dynamic pressure grooves 8c1 and hill portions 8c2 bent in V-shapes are alternately arranged in a circumferential direction.

As illustrated in FIG. 2, the housing 9 is opened at both the axial ends so as to exhibit a cylindrical shape, and integrally includes a body portion 9a having the bearing sleeve 8 retained to the inner periphery thereof and a seal portion 9b arranged on the radially inner side of the upper end of the body portion 9a. The inner peripheral surface of the body portion 9a has a cylindrical shape uniform in radial dimension, and the outer peripheral surface is formed into a shape of a stepped cylindrical surface in which the lower side thereof is radially narrowed. With this, a thick portion 9a1 is formed on the upper side of the body portion 9a, and a thin portion 9a2 thinner than the thick portion 9a1 is formed on the lower side thereof.

An inner peripheral surface 9b1 of the seal portion 9b is formed into a shape of a tapered surface gradually decreased downward in diameter, and a wedge-like seal space S1 gradually decreased downward in radial dimension is formed between the tapered inner peripheral surface 9b1 and the outer peripheral surface of the shaft portion 2a. The bearing inner space sealed with the seal portion 9b is filled with the lubricating oil. In the seal space S, there is formed an oil surface of the lubricating oil (gas-liquid interface) filling the inside of the bearing, and the oil surface is constantly retained in the seal space S owing to a drawing-in effect exerted by a capillary force of the wedge-like seal space S1. The volume of the seal space S is set such that the oil surface of the lubricating oil is retained within the range of the seal space S even in the case where the lubricating oil filling the inside of the bearing swells and contracts in accordance with change in temperature.

On the radially outer side of the upper end of the housing 9, which constitutes the boundary between the body portion 9a and the seal portion 9b, a corner portion is trimmed. Owing to a trimmed portion 9c thus formed, the thickness of the housing 9 is substantially uniformed in the region from the body portion 9a to the seal portion 9b. Thus, it is possible to suppress deformation of the seal portion 9b, which is caused by mold shrinkage of a resin, thereby possible to secure accuracy of shape of the seal space S.

The housing 9 described above is integrally formed together with the bearing sleeve 8 as an inserted component, for example, by injection molding of a resin. The resin material of the housing 9 is not particularly limited, and a resin composite which includes the following as a base resin is available thereas: for example, a crystalline resin such as liquid crystal polymer (LCP), polyphenylene sulfide (PPS), and polyether ether ketone (PEEK), or an amorphous resin such as polyphenylsulfone (PPSU), polyethersulfone (PES), and polyetherimide (PEI). The resin material can be mixed with an appropriate amount of fillers of various types in accordance with purposes. For example, it is possible to use a fibrous filler such as glass fiber, a whisker filler such as potassium titanate, a scale-like filler such as mica, and other appropriate powder fillers. In the conventional housing 9 made of resin, conductive fillers such as carbon fiber, carbon black, black lead, a carbon nano material, and various metal powders are normally mixed for the purpose of securing conductivity. However, in the housing 9 of the present invention, the conductive fillers of those types are basically unnecessary. However, as long as demanded characteristics for the housing 9 (moldability, for example) are not adversely affected or there is no problem in terms of cost, those conductive fillers may be mixed therewith.

Through insert molding of the housing 9, the upper end surface 8b of the bearing sleeve 8 is covered with a resin together with the outer peripheral chamfer 8eo. In addition, as illustrated in the figure, when at least the outer peripheral chamfer 8fo on the lower end of the bearing sleeve 8 is covered with a resin, it is possible to achieve retention of the bearing sleeve 8 with respect to the housing 9. The inner peripheral chamfer 8ei on the upper end of the bearing sleeve 8 is not covered with a resin, and structure of a sintered metal is exposed. This is because the bearing sleeve 8 is positioned within the die by bringing the inner peripheral chamfer 8ei into contact with the die at the time of injection molding.

The lid member 10 is fitted and fixed to the outer peripheral surface of the thin portion 9a2 of the housing 9, and closes the lower opening of the housing 9. In the illustrated example, the lid member 10 has a cup-like shape, a substantially disk-like plate portion 10a, and a cylindrical portion 10b extending upward from the radially outer end of the plate portion 10a. The lid member 10 is made of conductive metal material, and the plate portion 10a and the cylindrical portion 10b are formed integrally with each other, for example, by press working on a metal plate.

Figure 5:
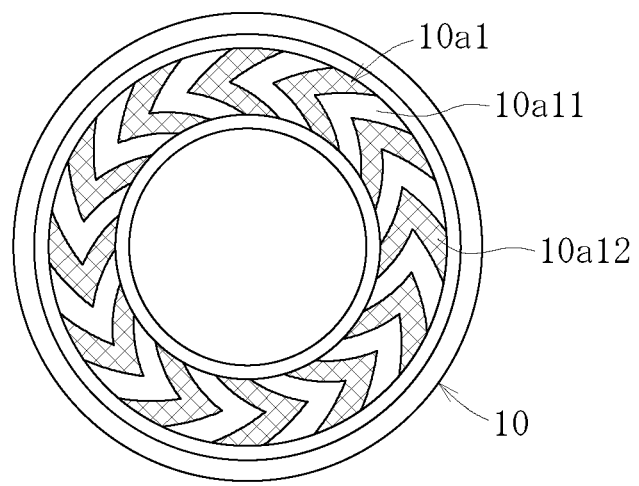
FIG. 5 is a plane view of a lid member illustrated in FIG. 2.

On an upper end surface 10a1 of the plate portion 10a, there is formed a thrust dynamic pressure generating portion for generating a dynamic pressure effect in the oil film in the thrust bearing gap. As illustrated in FIG. 5, the thrust dynamic pressure generating portion is formed in a herringbone pattern in which dynamic pressure grooves 10a11 and hill portions 10a12 bent in V-shapes are alternately arranged in a circumferential direction.

An upper end surface 10b1 of the cylindrical portion 10b of the lid member are opposed to a lower end surface 9a11 of the thick portion 9a1 of the housing 9 in the axial direction. After setting of widths of thrust bearing gaps described later, an axial gap $\delta 1$ is formed between both an end surface 10b1 and the end surface 9a11, and an axial gap $\delta 2$ is formed between the upper end surface 10a1 of the plate portion 10a and the lower end surface of the thin portion 9a2 of the housing 9. After the setting of the widths of the thrust bearing gaps, the axial gap $\delta 1$ may be reliably sealed by being filled with adhesive. In order to reduce an oil retaining amount inside the bearing device, it is desirable that the axial gap $\delta 2$ be as small as possible.

When the fluid dynamic bearing device 1 structured as described above is assembled, first, the shaft member 2 is inserted along the inner periphery of the bearing sleeve 8 integrated with the housing 9. Next, adhesive is applied to the outer peripheral surface of the thin portion 9a2 of the housing 9 or the inner peripheral surface of the cylindrical portion 10b of the lid member 10, and the inner peripheral surface of the cylindrical portion 10b of the lid member 10 is fitted to the outer peripheral surface of the thin portion 9a2. The lid member 10 continues to be pressed and advanced so as to bring the bearing sleeve 8 and the plate portion 10a of the lid member 10 into contact with both end surfaces 2b1 and 2b2 of the flange portion 2b (that is, the gap widths of the thrust bearing gaps become zero). In this case, dimensions of components are set such that the upper end surface 10b1 of the cylindrical portion 10b of the lid member 10 and the lower end surface 9a11 of the thick portion 9a1 of the housing 9 are not brought into contact with each other and that the upper end surface 10a1 of the plate portion 10a and the lower end surface of the thin portion 9a2 are not brought into contact with each other. Next, the lid member 10 is drawn back downward to the housing 9 by the total amount of the gap widths of the thrust bearing gaps (direction of being separated from housing 9). After that, by curing the adhesive, attachment of the lid member 10 and the setting of the widths of the thrust bearing gaps are simultaneously completed. With this procedure, it is possible to control the widths of the thrust bearing gaps with the moving amount of the lid member 10, and hence is possible to reduce working cost thereof by relaxing working accuracy of the components.

After the completion of the assembly, the inner space of the fluid dynamic bearing device 1, that is, the space sealed by the housing 9 and the lid member 10, which includes inner pores of the bearing sleeve 8, is filled with a lubricating oil as a lubricating fluid.

In the fluid dynamic bearing device 1, when the shaft member 2 is rotated, two radial bearing gaps are formed between the upper and lower dynamic pressure groove regions formed on the inner peripheral surface 8a of the bearing sleeve 8 and the outer peripheral surface of the shaft portion 2a opposed thereto. The pressure of the oil film in the radial bearing gaps is increased by the dynamic pressure grooves 8a1 and 8a2, whereby there are constituted a first radial bearing portion R1 and a second radial bearing portion R2 for supporting the shaft member 2 in a radial direction in a non-contact manner. Simultaneously, between an upper end surface 2b1 of the flange portion 2b of the shaft member 2 and a lower end surface 8c of the bearing sleeve 8, and between a lower end surface 2b2 of the flange portion 2b of the shaft member 2 and the upper end surface 10a1 of the plate portion 10a of the lid member 10, thrust bearing gaps are formed, respectively. The pressure of the oil film in the thrust bearing gaps is increased by the dynamic pressure grooves 8c1 and 10a11, whereby there are constituted a first thrust bearing portion T1 and a second thrust bearing portion T2 for supporting the shaft member 2 in the thrust direction in a non-contact manner.

The fluid dynamic bearing device 1 is assembled into a motor by, for example, bonding and fixing the outer peripheral surface of the cylindrical portion 10b of the lid member 10 and the outer peripheral surface of the body portion 9a of the housing 9 to the inner peripheral surface of the motor bracket 6. When the outer diameter dimensions of the cylindrical portion 10b of the lid member 10 and the body portion 9a of the housing 9 are equal to each other, the cylindrical portion 10b of the lid member 10 and the body portion 9a of the housing 9 are reliably fixed to the cylindrical inner peripheral surface of the motor bracket 6. Both the lid member 10 and the motor bracket 6 are made of metal, and hence high bonding strength can be achieved between both the members. In the case where sufficient fixation strength can be secured between the lid member 10 and the motor bracket 6, it is unnecessary to purposely bond and fix the body portion 9a of the housing 9 and the motor bracket 6 to each other.

As described above, in the present invention, the housing 9 is formed by injection molding (insert molding) together with the bearing sleeve 8 inserted therein. Therefore, it is possible to complete molding of the housing 9 and fixation of the bearing sleeve 8 with respect to the housing 9 within one step. For example, in the case where the housing 9 and the bearing sleeve 8 are separately manufactured and the bearing sleeve 8 is bonded and fixed to the housing 9, in order to secure coaxiality between the housing 9 and the bearing sleeve 8, it is necessary to bind both the members with a jig until adhesive on each of the products is completely cured. Thus, a large amount of labor is required for securing the accuracy. In contrast, in the case of the insert molding, merely by positioning the bearing sleeve with high accuracy within an injection molding die, it is possible to secure coaxiality of high accuracy. Accordingly, it is possible to efficiently manufacture an integrally-molded product of the housing 9 and the bearing sleeve 8, which has high coaxiality, thereby possible to achieve cost reduction.

Further, the lid member 10 is fixed to the outer peripheral surface of the housing 9, and hence, in comparison with the conventional cases of fixing the lid member 10 to the inner peripheral surface of the housing 9, the fixation area between both the members can be increased correspondingly to the radial difference between the inner peripheral surface and the outer peripheral surface. Further, by decreasing the axial length of the thick portion 9a1 of the housing 9, it is possible to increase the axial dimension of the cylindrical portion 10b of the lid member 10, thereby possible to easily achieve further increase in fixation area. In addition, it is unnecessary to increase the thickness of the lid member 10 in accordance therewith. Accordingly, retention strength of the lid member 10 can be increased without influence on the axial dimension of the bearing device 1 or on the bearing span between the radial bearing portions R1 and R2.

The lid member 10 is made of metal material, and hence static electricity charged by the rotation of the disks D can be reliably discharged to the ground through a path constituted by the shaft member 2, the lid member 10, and the motor bracket 6. In the case where the lid member 10 and the motor bracket 6 are bonded and fixed to each other, in order to prevent the conductive path from being blocked by adhesive (normally, an insulant is used), when necessary, an appropriate conductive material (paste-like material obtained by dispersing metal powder, for example) is applied across the radially outer end of the lower end of the lid member 10 and the radially inner end of the lower end of the bracket 6 (region A of FIG. 1) so as to form a conductive film.

When the conductive path is constituted by the lid member 10 as described above, it is unnecessary to impart conductivity to the housing 9, and hence a range of choice of the material is expanded in considering a molding material of the housing, which leads to an increase in degree of freedom in designing a bearing device. In the case where conductivity is imparted to the housing 9 made of resin, an expensive conductive filler is normally mixed within the resin material as described above. However, in the present invention, it is possible to omit mixing of the conductive filler of this type or to reduce a mixing amount, thereby possible to reduce material cost.

Conventionally, the housing, the bearing sleeve, and the seal portion are constituted by separate members, and the bearing sleeve and the seal member are individually fixed to the housing. In this structure, in order to prevent an imbalance of hydraulic pressure inside the bearing device, in many cases, circulation paths are formed between the outer peripheral surface of the bearing sleeve and the inner peripheral surface of the housing, and between the end surface of the seal member and the upper end surface 8b opposed thereto so that the upper thrust bearing gap and the seal space S are communicated with each other. The circulation paths of this type are normally constituted by one or multiple grooves respectively formed in the outer peripheral surface 8d and the upper end surface 8b of the bearing sleeve 8.

In contrast, as in the present invention, in the case where the housing 9 is formed by injection molding together with the bearing sleeve 8 inserted therein, the above-mentioned grooves are also filled with a resin, and hence it is difficult to form the circulation paths. Therefore, the fluid dynamic bearing device 1 illustrated in FIG. 2 is not provided with the circulation paths. However, when injection molding is performed after the above-mentioned grooves are purposely formed in the outer peripheral surface and the end surface of the bearing sleeve 8, the resin filled into the grooves exerts an anchoring effect, and hence the bearing sleeve 8 can be retained and prevented from being rotated. FIG. 2 illustrates a structure in which an annular groove 8b1 as a vertical reference mark is formed in the upper end surface 8b of the bearing sleeve 8, and the bearing sleeve 8 is subjected to injection molding so that the annular groove 8b1 is filled with the resin. Note that, when being particularly unnecessary, those grooves (annular groove 8b1 of FIG. 2) may be omitted.

Figure 6:
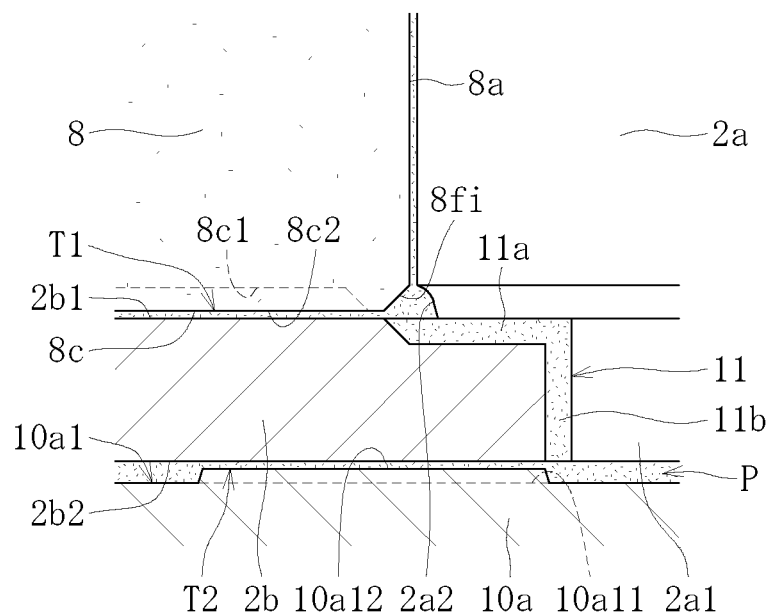
FIG. 6 is an enlarged sectional view of a main portion of the fluid dynamic bearing device illustrated in FIG. 2.

As illustrated also in FIG. 6 in an enlarged manner, the shaft member 2 is provided with a communication hole 11 opened in the upper end surface 2b1 and the lower end surface 2b2 of the flange portion 2b. By providing the communication hole 11, a lubricating oil can be communicated between the upper and lower thrust bearing gaps through the communication hole 11. With this, a pressure balance (pressure balance at the time of activation of a motor, in particular) can be maintained between the upper thrust bearing gap and the lower thrust bearing gap.

The communication hole 11 illustrated in FIG. 6 has a radial portion 11a and an axial portion 11b which are opened, while respectively avoiding the dynamic pressure groove regions of both the thrust bearing portions T1 and T2, to the radially inner side with respect thereto. Thus, the communication hole 11 has a bent shape. More specifically, the radially outer end of the radial portion 11a is opened to a space defined by the upper end surface 2b1 of the flange portion 2b, the inner peripheral chamfer 8fi of the bearing sleeve 8, and an escape portion 2a2 provided in the lower end portion of the shaft portion 2a. The axial portion 11b continuous with the radially inner end of the radial portion 11a extends to the outer peripheral surface of the small diameter portion 2a1 of the shaft portion 2a so as to be opened to the radially inner side of the thrust dynamic pressure generating portion of the second thrust bearing portion T2 (bottom space P). An axial groove is formed in the inner peripheral surface of the flange portion 2b of a perforated-disk shape, and a radial groove communicated with the axial groove is formed in the upper end surface 2b1 of the flange portion 2b. After that, the small diameter portion 2a1 of the shaft portion 2a is fitted and fixed into the inner peripheral hole of the flange portion 2b. In this manner, it is possible to form the radial portion 11a in the radial groove, and to form the axial portion 11b in the axial groove. Note that, the communication hole 11 may be formed at a single point in a circumferential direction, or may be formed at multiple points.

When the shaft member 2 is rotated, owing to an imbalance of pumping capacities of the upper and lower radial dynamic pressure generating portions (refer to FIG. 3), the oil between the inner peripheral surface of the bearing sleeve 8 and the outer peripheral surface of the shaft portion 2a is pressed downward. Therefore, pressure tends to be increased in the space on the closed side inside the bearing, in particular, in the space on the radially inner side with respect to the lower thrust bearing gap (bottom space P). In such a case, when the dynamic pressure grooves 10a11 of the second thrust bearing portion T2 are provided in a spiral pattern of a pump-in type, which is frequently used in the conventional products, the oil in the thrust bearing gap is pressed to the radially inner side. As a result, an increase in pressure of a bottom surface space P is promoted. In order to avoid this, it is desirable that the dynamic pressure grooves 10a11 of the second thrust bearing portion be provided in a herringbone pattern as described above (refer to FIG. 5). The problems of this type do not arise in the first thrust bearing portion T1 on the upper side, and hence the dynamic pressure grooves provided in the spiral pattern of a pump-in type may be adopted in place of the dynamic pressure grooves 8c1 illustrated in FIG. 4.

The present invention is not limited to the above-mentioned embodiment. In the following, another embodiment of the present invention is described. Note that, in the following description, the portions having same structures and functions as those in the above-mentioned embodiment are described while denoted by the same reference symbols, and description thereof is omitted.

Figure 7:
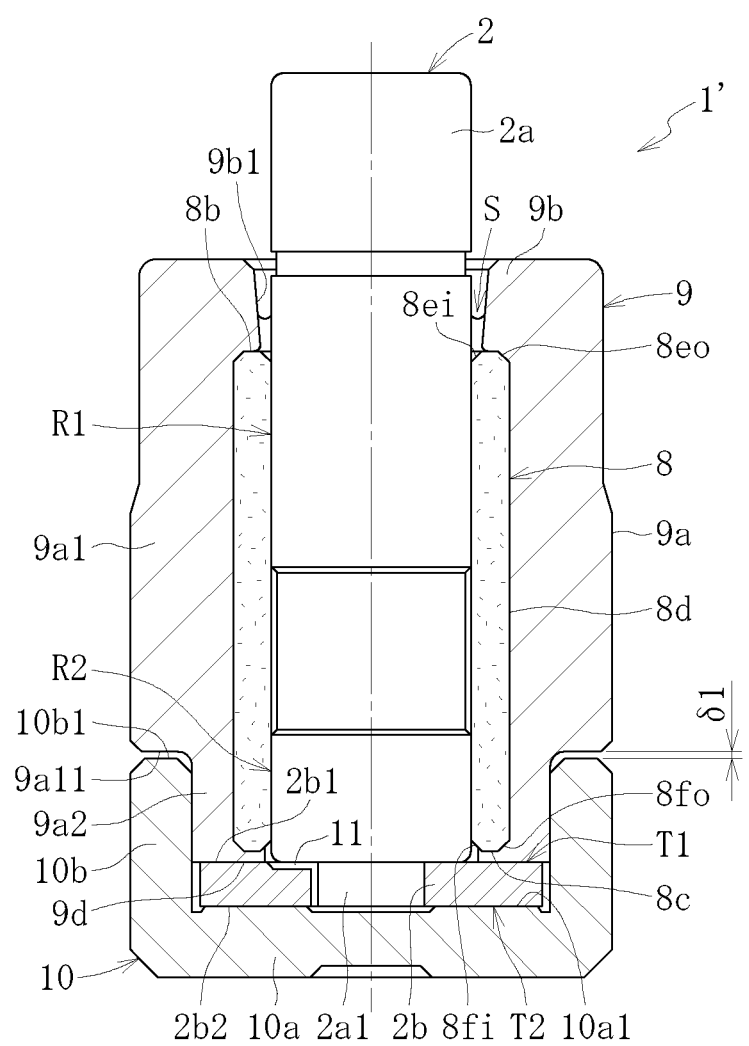
FIG. 7 is a sectional view of a fluid dynamic bearing device according to a second embodiment of the present invention.

FIG. 7 illustrates a fluid dynamic bearing device 1' according to a second embodiment of the present invention. Similarly to the fluid dynamic bearing device 1 illustrated in FIG. 2, in the fluid dynamic bearing device 1' illustrated in the figure, the housing 9 is an injection-molded product of a resin in which the bearing sleeve 8 is inserted, and the metal lid member 10 is fixed to the outer peripheral surface of the housing 9, specifically, the outer peripheral surface of the thin portion 9a2. After the setting of the widths of the thrust bearing gaps, the axial gap δ1 is formed between the end surface 10b1 of the cylindrical portion 10b of the lid member 10 and the end surface of the thick portion 9a1 of the housing 9.

In the fluid dynamic bearing device 1 illustrated in FIG. 2, the outer peripheral chamfer 8fo on the lower end of the bearing sleeve 8 is covered with the housing 9 made of resin, and the lower end surface 8c is not covered. In contrast, in the fluid dynamic bearing device 1' illustrated in FIG. 7, a cover portion 9d extending toward a radially inner side is formed at the lower end of a thin portion 9a2 of the housing 9, the cover portion 9d covers not only the outer peripheral chamfer 8fo of the bearing sleeve 8 but also the entire of the lower end surface 8c of the bearing sleeve 8. On the end surface of the cover portion 9d, there are formed a plurality of dynamic pressure grooves (dynamic pressure grooves in a herringbone pattern illustrated in FIG. 5, for example) serving as the thrust dynamic pressure generating portion of the first thrust bearing portion T1. Note that, an inner peripheral chamfer 8fi on the lower end of the bearing sleeve 8 is not covered with the cover portion 9d.

In this manner, by forming the thrust dynamic pressure generating portion to the cover portion 9d of the housing 9, in the embodiment illustrated in FIG. 2, the thrust dynamic pressure generating portion formed in the lower end surface 8c of the bearing sleeve 8 becomes unnecessary. Therefore, the radial thickness of the bearing sleeve 8 can be reduced compared with that in the embodiment illustrated in FIG. 2. Due to this reduction in thickness, it is possible to reduce the oil retaining amount in the bearing sleeve 8 made of sintered metal. Therefore, it is possible to reduce the oil retaining amount in the entire bearing device, and hence the thermal expansion amount of the oil at the time of temperature rise can be suppressed. Accordingly, volume of the seal space S can be reduced, and hence it is possible to reduce the axial dimension of the seal space S, thereby possible to reduce the entire size of the bearing device.

Note that, the thrust dynamic pressure generating portion of the cover portion 9d can be die-molded simultaneously with the injection molding of the housing 9 by forming a molding die corresponding to the thrust dynamic pressure generating portion to a die. Therefore, it is possible to omit a step of forming the thrust dynamic pressure generating portion, to thereby achieve the cost reduction.

By reducing the axial dimension of the seal space S, the difference in thickness between the seal portion 9b and the body portion 9a in the housing 9 is reduced, and hence deformation at the time of mold shrinkage of the resin becomes less likely to occur. Therefore, in the fluid dynamic bearing device 1' according to this embodiment, a trimmed portion 9c (refer to FIG. 2) formed on the upper-end outer diameter portion of the housing 9 is omitted.

As described above in this embodiment, while a resin is used as an injection material of the housing 9, this should not construed restrictively. For example, the housing 9 may be formed by injection molding of a low-melting metal material such as a magnesium alloy or an aluminum alloy.

Further, as described above in this embodiment, when the lid member 10 is fixed to the bearing sleeve 8, adhesive is applied in advance to the thin portion 9a2 of the housing 9 and the cylindrical portion 10b of the lid member 10, and then the lid member 10 is fitted to the thin portion 9a2 of the housing. Alternatively, the lid member 10 and the housing 9 may be first fitted to each other so as to perform the setting of the widths of the thrust bearing gaps, and then adhesive may be supplied from the axial gap δ1 so that the adhesive is drawn-in with a capillary force of a minute gap between the inner peripheral surface of the lid member 10 and the outer peripheral surface of the thin portion 9a2. In this manner, the fixation and bonding therebetween may be performed. Further, as described above in this embodiment, while there is illustrated the case where the lid member 10 and the bearing sleeve 8 are fixed by bonding to each other, this should not construed restrictively. For example, the fixation may be performed by means such as press-fit bonding or welding.

Further, in the above-mentioned embodiments, the dynamic pressure generating portions of the radial bearing portions R1 and R2, and the thrust bearing portions T1 and T2 are respectively formed in the inner peripheral surface 8a and the lower end surface 8c of the bearing sleeve 8, and the upper end surface 10a1 of the plate portion 10a of the lid member 10. However, it is also possible to form them on the surfaces facing these surfaces through an intermediation of the bearing gaps, that is, the outer peripheral surface of the shaft portion 2a, the upper end surface 2b1 or the lower end surface 2b2 of the flange portion 2b.

Further, in the above-mentioned embodiments, there is exemplified a case of forming the dynamic pressure grooves in a herringbone pattern as the radial dynamic pressure generating portions of the radial bearing portions R1 and R2. However, this should not be construed restrictively. For example, it is also possible to adopt a so-called step bearing, a corrugated bearing, or a multirobe bearing. Further, it is also possible to adopt as the radial bearing portions R1 and R2 a so-called cylindrical bearing in which both of the inner peripheral surface 8a of the bearing sleeve 8 and the outer peripheral surface 2a1 of the shaft member 2 are formed as cylindrical surfaces. In this case, there are not provided the dynamic pressure generating portions for making the fluid film in the radial bearing gaps to positively generate the dynamic pressure effect. However, at the time of rotation of the shaft member, the dynamic pressure effect is generated in the fluid film due to viscosity of the lubrication fluid to form the radial bearing portions R1 and R2.

Further, in the above-mentioned embodiments, there is exemplified a case of using the dynamic pressure grooves as the thrust dynamic pressure generating portions of the thrust bearing portions T1 and T2. However, this should not be construed restrictively. For example, it is also possible to adopt the structure of the step bearing or the corrugated bearing. Alternatively, in place of the thrust bearing portions T1 and T2 constituted by the dynamic pressure bearing, it is also possible to constitute the thrust bearing portions by a pivot bearing contact-supporting the end portion of the shaft member 2 with the upper end surface 10a1 of the plate portion 10a of the lid member 10.

Further, while in the above-mentioned embodiments the radial bearing portions R1 and R2 are axially spaced apart from each other, they may also be provided so as to be continuous with each other in the axial direction. Alternatively, it is also possible to provide only one of these radial bearing portions.

Figure 8:
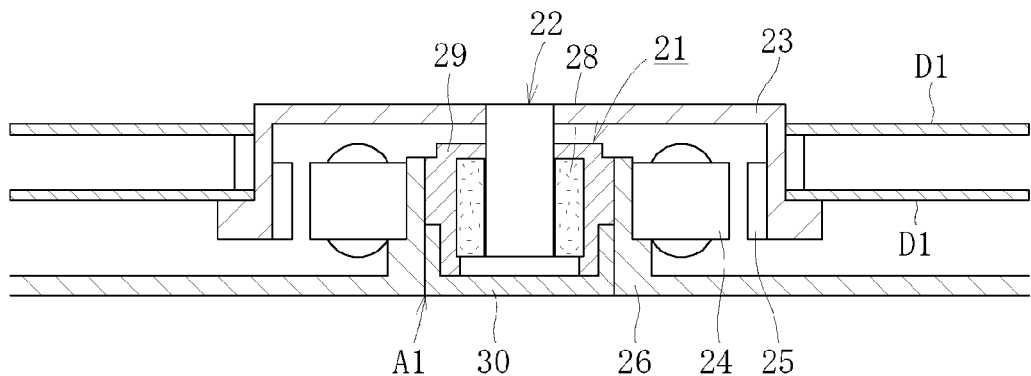
FIG. 8 is a sectional view of the spindle motor.
Figure 9:
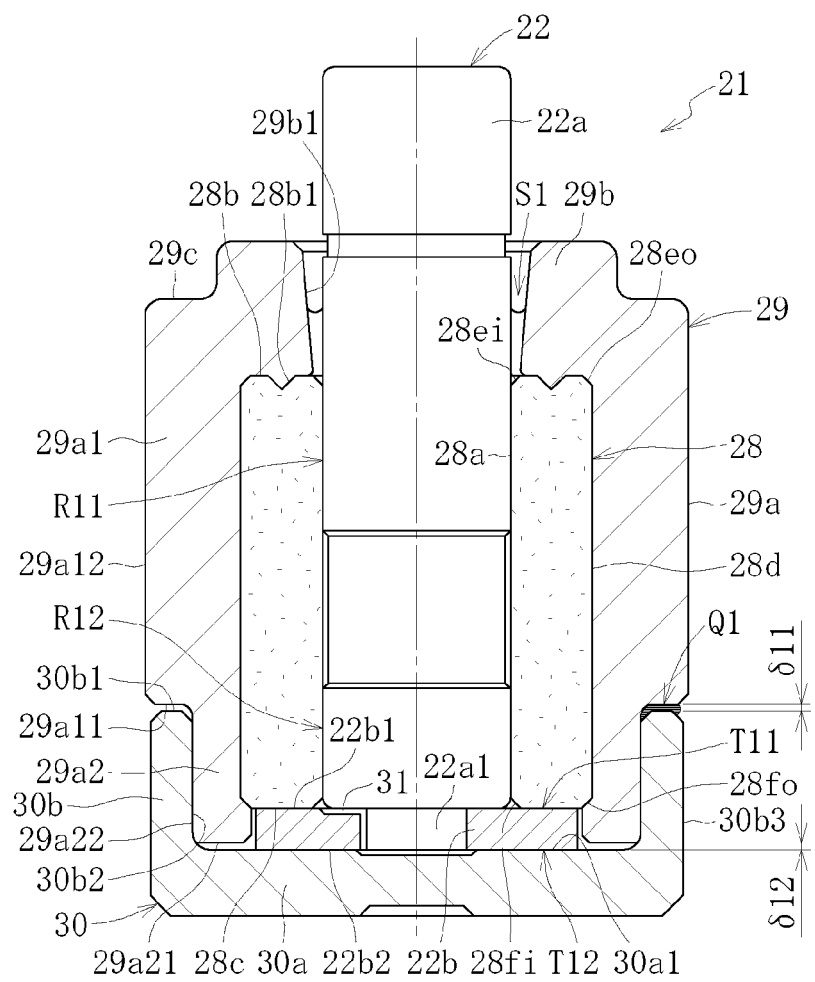
FIG. 9 is a sectional view of a fluid dynamic bearing device according to a third embodiment of the present invention.

FIG. 8 conceptually illustrates a construction example of a spindle motor for an information apparatus incorporating a fluid dynamic bearing device 21 illustrated in FIG. 9. The spindle motor is used for a disk drive such as an HDD, and includes the fluid dynamic bearing device 21 for rotatably supporting a shaft member 22, a disk hub 23 fixed to the upper end portion of the shaft member 22, a stator coil 24 and a rotor magnet 25 opposed to each other through an intermediation of a gap (radial gap in the illustrated example), and a base member 26 (motor bracket) made of metal material such as an aluminum alloy. The stator coil 24 is mounted to the outer periphery of the base member 26, and the rotor magnet 25 is attached to the inner periphery of the disk hub 23. The fluid dynamic bearing device 21 is fixed to the inner periphery of the base member 26. One or multiple (two in FIG. 8) disks D1 as information recording media are held on the disk hub 23, and fixed by a clamping device (not shown). The rotor magnet 25 is rotated when the stator coil 24 is energized, and in accordance therewith, the disk hub 23 and disks D1 held on the disk hub 23 are integrally rotated with the shaft member 22.

The fluid dynamic bearing device 21 illustrated in FIG. 9 includes the shaft member 22, a bearing sleeve 28 having the shaft member 22 inserted along the inner periphery thereof, a housing 29 opened at both axial ends and accommodating the bearing sleeve 28, and a lid member 30 for closing an opening on one end side in the axial direction (lower end side in the illustrated example) of the bearing sleeve 28. In this embodiment, the housing 29 constitutes an outer member opened at both ends. Note that, in the following, for the sake of convenience in illustration, in the axial direction of the housing 29, the side closed by the lid member 30 is referred to as a lower side, and the side opposite thereto is referred to as an upper side.

The shaft member 22 includes a shaft portion 22a and a flange portion 22b. The shaft portion 22a and the flange portion 22b are made of metal material excellent in abrasion resistance, such as stainless steel. A small diameter portion 22a1 is formed at the lower end of the shaft portion 22a, and the shaft member 22 is formed by fitting and fixing the small diameter portion 22a1 to the inner periphery of the flange portion 22b of a perforated-disk shape. The fixing method for the shaft portion 22a and the flange portion 22b is arbitrary, and hence press-fitting, bonding, or the like may be adopted. Further, as illustrated in FIG. 16A, it is possible to form the flange portion 22b into a perforated-disk shape so as to have an inner diameter dimension Db1 smaller than an outer diameter dimension Da1 of the shaft portion 22a (Db1<Da1), and possible to cause the flange portion 22b and the shaft portion 22a to butt against each other so as to weld (laser welding, for example) a corner portion W1 formed by the inner peripheral surface of the flange portion 22b and the end surface of the shaft portion 22a. The shaft portion 22a and the flange portion 22b integrally molded by forging or the like may be used as the shaft member 22.

Figure 10:
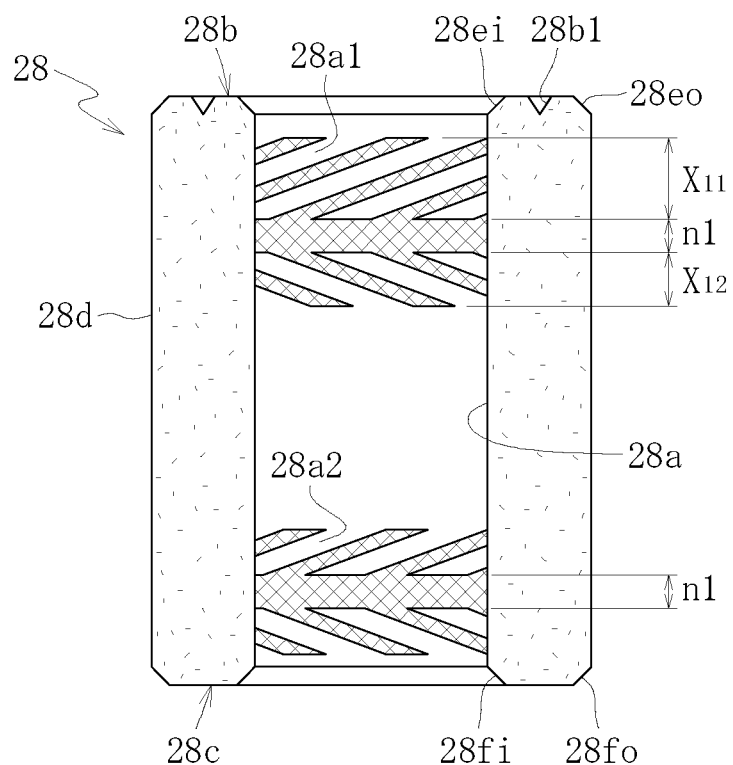
FIG. 10 is a sectional view of a bearing sleeve illustrated in FIG. 9.

As illustrated in FIG. 10, the bearing sleeve 28 is formed into a cylindrical shape with use of a porous body such as a sintered metal containing any one of or both copper and steel as a main component. Alternatively, the bearing sleeve 28 may be made of another metal, a resin, ceramic, or the like. An inner peripheral surface 28a and an outer peripheral surface 28b of the bearing sleeve 28 are formed as cylindrical surfaces uniform in radial dimension in the axial direction. Further, on the radially inner end and the radially outer end of both the axial ends of the bearing sleeve 28, chamfers 28ei, 28fi, 28eo, and 28fo are formed, respectively.

In part of the axial region of the inner peripheral surface 28a of the bearing sleeve 28, there are formed radial dynamic pressure generating portions for generating a dynamic pressure effect in the fluid film (oil film) in the radial bearing gaps. In this embodiment, as illustrated in FIG. 10, the radial dynamic pressure generating portions respectively constituted by herringbone dynamic pressure grooves 28a1 and 28a2 and cross-hatched hill portions are formed in two points axially separated from each other. In the upper radial dynamic pressure generating portion, the dynamic pressure grooves 28a1 are formed asymmetrically in the axial direction, specifically, with respect to a belt-like pressure generating portion n1 formed on the substantially central portion in the axial direction of the hill portion, an axial dimension X11 of the upper grooves is larger than an axial dimension X12 of the lower grooves (X11>X12). In the lower radial dynamic pressure generating portion, the dynamic pressure grooves 28a2 are asymmetrically formed in the axial direction. Owing to an imbalance of pumping capacities of the radial dynamic pressure generating portions described above, when the shaft member 22 is rotated, the oil filling the gap between the inner peripheral surface 28a of the bearing sleeve 28 and the outer peripheral surface of the shaft portion 22a is pressed downward.

Figure 11:
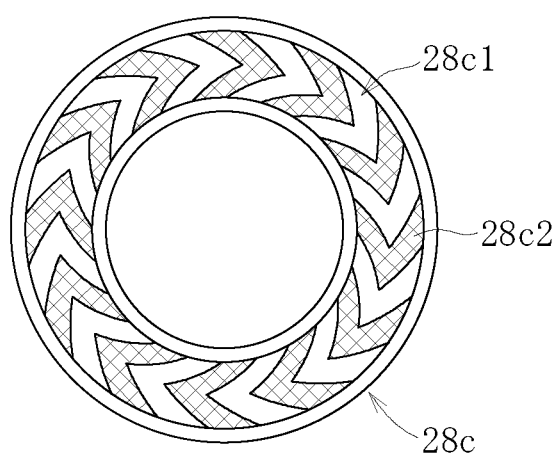
FIG. 11 is a bottom view of the bearing sleeve illustrated in FIG. 9.

On a lower end surface 28c of the bearing sleeve 28, there is formed a thrust dynamic pressure generating portion for generating a dynamic pressure effect in the oil film in the thrust bearing gap. As illustrated in FIG. 11, the thrust dynamic pressure generating portion is formed in a herringbone pattern in which dynamic pressure grooves 28c1 and hill portions 28c2 bent in V-shapes are alternately arranged in a circumferential direction.

As illustrated in FIG. 9, the housing 29 is opened at both the axial ends so as to exhibit a cylindrical shape, and integrally includes a cylindrical body portion 29a having the bearing sleeve 28 retained to the inner periphery thereof and a seal portion 29b arranged on the radially inner side of the upper end of the body portion 29a. The inner peripheral surface of the body portion 29a has a cylindrical shape uniform in radial dimension, and the outer peripheral surface is formed into a shape of a stepped cylindrical surface in which the lower side thereof is radially narrowed. With this, a thick portion 29a1 is formed on the upper side of the body portion 29a, and a thin portion 29a2 thinner than the thick portion 29a1 is formed on the lower side thereof.

An inner peripheral surface 29b1 of the seal portion 29b is formed into a shape of a tapered surface gradually decreased downward in diameter, and a wedge-like seal space S1 gradually decreased downward in radial dimension is formed between the tapered inner peripheral surface 29b1 and the outer peripheral surface of the shaft portion 22a. The bearing inner space sealed with the seal portion 29b, which includes inner pores of the bearing sleeve 28, is filled with the lubricating oil. In the seal space S1, there is formed an oil surface of the lubricating oil (gas-liquid interface) filling the inside of the bearing, and the oil surface is constantly retained in the seal space S1 owing to a drawing-in effect exerted by a capillary force of the wedge-like seal space S1. The volume of the seal space S1 is set such that the oil surface of the lubricating oil is retained within the range of the seal space S1 even in the case where the lubricating oil filling the inside of the bearing swells and contracts in accordance with change in temperature.

On the radially outer side of the upper end of the housing 29, which constitutes the boundary between the body portion 29a and the seal portion 29b, a corner portion is trimmed. Owing to a trimmed portion 29c thus formed, the thickness of the housing 29 is substantially uniformed in the region from the body portion 29a and the seal portion 29b. Thus, it is possible to suppress deformation of the inner peripheral surface 29b1 of the seal portion 29b, which is caused by mold shrinkage of a resin, thereby possible to secure accuracy of shape of the seal space S1.

The housing 29 described above is integrally formed together with the bearing sleeve 28 as an inserted component, for example, by injection molding of a resin. The resin material of the housing 29 is not particularly limited, and a resin composite which includes the following as a base resin is available thereas: for example, a crystalline resin such as liquid crystal polymer (LCP), polyphenylene sulfide (PPS), and polyether ether ketone (PEEK), or an amorphous resin such as polyphenylsulfone (PPSU), polyethersulfone (PES), and polyetherimide (PEI). The resin material can be mixed with an appropriate amount of fillers of various types in accordance with purposes. For example, it is possible to use a fibrous filler such as glass fiber, a whisker filler such as potassium titanate, a scale-like filler such as mica, and other appropriate powder fillers. In the conventional housing 29 made of resin, which is used for an HDD, conductive fillers such as carbon fiber, carbon black, black lead, a carbon nano material, and various metal powders are normally mixed for the purpose of securing conductivity. However, in the housing 29 of the present invention, the conductive fillers of those types are basically unnecessary. Note that, as long as demanded characteristics for the housing 29 (moldability, for example) are not adversely affected or there is no problem in terms of cost, those conductive fillers may be mixed therewith.

Through insert molding of the housing 29, the upper end surface 28b of the bearing sleeve 28 is covered with a resin together with the outer peripheral chamber 28eo. In addition, as illustrated in FIG. 9, when at least the outer peripheral chamfer 28fo on the lower end of the bearing sleeve 28 is covered with a resin, it is possible to achieve retention of the bearing sleeve 28 with respect to the housing 29. The inner peripheral chamfer 28ei on the upper end of the bearing sleeve 28 is not covered with a resin, and structure of a sintered metal is exposed. This is because the bearing sleeve 28 is positioned within the die by bringing the inner peripheral chamfer 28ei into contact with the die at the time of injection molding.

The lid member 30 is fixed, for example, by gap-filling bonding to the outer peripheral surface of the thin portion 29a2 of the housing 29. The lower opening of the housing 29 is closed by the lid member 30. In the illustrated example, the lid member 30 has a cup-like shape, a substantially disk-like plate portion 30a, a cylindrical portion 30b extending upward from the radially outer end of the plate portion 30a. The axial length of an inner peripheral surface 30b2 of the cylindrical portion 30b is larger than the thickness in the axial direction of the plate portion 30a. The lid member 30 is made of conductive metal material, and the plate portion 30a and the cylindrical portion 30b are formed integrally with each other, for example, by press working on a metal plate. The inner peripheral surface 30b2 of the cylindrical portion 30b is overlapped in the axial direction with part (part including at least pressure generating portion n1) or the entire of the lower radial dynamic pressure generating portion constituted by the dynamic pressure grooves 28a2 and the hill portion.

Figure 12:
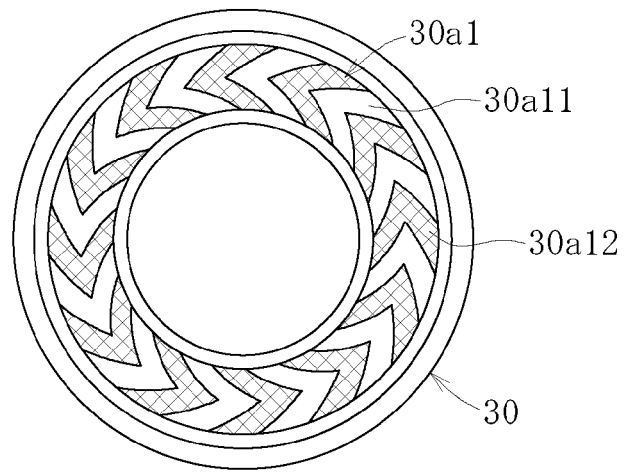
FIG. 12 is a plane view of a lid member illustrated in FIG. 9.

On an upper end surface 30a1 of the plate portion 30a, there is formed a thrust dynamic pressure generating portion for generating a dynamic pressure effect in the oil film in the thrust bearing gap. As illustrated in FIG. 12, the thrust dynamic pressure generating portion is formed in a herringbone pattern in which dynamic pressure grooves 30a11 and hill portions 30a12 bent in V-shapes are alternately arranged in a circumferential direction.

When the fluid dynamic bearing device 21 structured as described above is assembled, first, the shaft member 22 is inserted along the inner periphery of the bearing sleeve 28 integrated with the housing 29. Next, adhesive is applied to an outer peripheral surface 29a22 of the thin portion 29a2 of the housing 29 or the inner peripheral surface 30b2 of the cylindrical portion 30b of the lid member 30, and the inner peripheral surface 30b2 of the cylindrical portion 30b is fitted to the outer peripheral surface 29a22 of the thin portion 29a2. Examples of the available adhesives include an anaerobic adhesive and an epoxy adhesive.

Figure 13:
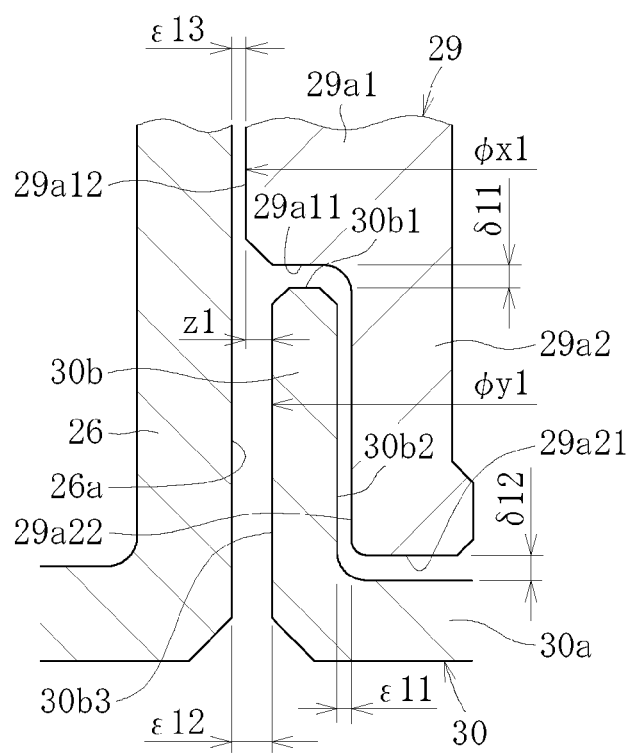
FIG. 13 is an enlarged sectional view illustrating bonding portions between the lid member, a housing, and a base member.

In the case where the housing 29 and the lid member 30 are bonded to each other in a gap-filling manner, as illustrated in FIG. 13, the inner peripheral surface 30b2 of the cylindrical portion 30b and the outer peripheral surface 29a22 of the thin portion 29a2 are loosely fitted to each other so as to form a first radial gap having a width $\epsilon 11$ therebetween (width $\epsilon 11$ in this case is obtained by deducting the radial dimension of outer peripheral surface 29a22 of thin portion 29a2 from the radial dimension of inner peripheral surface 30b2 of cylindrical portion 30b). Note that, as long as the surface accuracy of the lower radial dynamic pressure generating portion formed on the inner peripheral surface 28a of the bearing sleeve 28 is not affected, the inner peripheral surface 30b2 of the cylindrical portion 30b may be lightly press-fitted to the outer peripheral surface 29a22 of the thin portion 29a2.

After the outer peripheral surface 29a22 of the thin portion 29a2 and the inner peripheral surface 30b2 of the cylindrical portion 30b are fitted to each other, the lid member 30 is pressed and advanced so as to bring the lower end surface 28c of the bearing sleeve 28 and the plate portion 30a of the lid member 30 into contact with both the end surfaces 22b1 and 22b2 of the flange portion 22b (that is, the gap widths of the two thrust bearing gaps become zero). In this case, dimensions of components are set in advance such that axial gap are left between an upper end surface 30b1 of the cylindrical portion 30b of the lid member 30 and an end surface 29a11 of the thick portion 29a1 of the housing 29 and between a lower end surface 29a21 of the thin portion 29a2 of the housing 29 and the upper end surface 30a1 of the plate portion 30a of the lid member 30, and that those two opposed axial surfaces are not brought into contact with each other. Next, the lid member 30 and the housing 29 are relatively moved in the axial direction of separating from each other by the total amount of the gap widths of the thrust bearing gaps. This movement can be performed by pulling up the shaft member 22 while fixing the lid member 30, or by pressing down the shaft member 22 while fixing the housing 29. With this, a first axial gap having a width $\delta 11$ is formed between the upper end surface $30b1$ of the cylindrical portion $30b$ of the lid member 30 and the end surface $29a11$ of the thick portion $29a1$ of the housing 29. As a result, a second axial gap having a width $\delta 12$ is formed between the lower end surface $29a21$ of the thin portion $29a2$ of the housing 29 and the upper end surface $30a1$ of the plate portion $30a$ of the lid member 30. In order to reduce an oil retaining amount inside the bearing device, it is desirable that the width $\delta 2$ of the second axial gap $\delta 2$ be as small as possible.

Next, as illustrated on the right side of FIG. 9, an epoxy adhesive Q1 is supplied into the first axial gap (width $\delta 11$). After that, through baking, part of the adhesive Q1 decreased in viscosity under high temperature is drawn into the first radial gap (width $\epsilon 11$) by a capillary force and cured, and a remainder thereof remains in the first axial gap (width $\delta 11$) and cured. With this, the lid member 30 and the housing 29 are completely bonded and fixed to each other, and a width setting operation of the thrust bearing gaps is simultaneously completed. Further, the first axial gap (width $\delta 11$) is sealed by the adhesive Q1, whereby oil is prevented from leaking through the fitting portion between the inner peripheral surface $30b2$ of the cylindrical portion $30b$ and the outer peripheral surface $29a22$ of the thin portion $29a2$. While FIG. 9 illustrates, in order to facilitate the understanding of the figure, a state in which only part of the circumferential region of the first axial gap (right side of the figure) is sealed by the adhesive Q1, normally, the entire periphery thereof is sealed by the adhesive Q1.

Note that, the adhesive Q1 is not limited to an epoxy adhesive, and an anaerobic adhesive, an ultraviolet-curable adhesive, or the like may be arbitrarily used. In the case of using the ultraviolet-curable adhesive, by curing surplus part thereof through ultraviolet radiation, operability and workability can be enhanced.

In this assembly method, it is necessary to obtain a sufficient capillary force in the first radial gap (width $\epsilon 11$) illustrated in FIG. 13 such that the adhesive Q1 is reliably drawn into the first radial gap. Therefore, it is desirable that the width $\epsilon 11$ of the first radial gap be as small as possible, the width $\epsilon 11$ being at least smaller than the width $\delta 11$ of the first axial gap ($\delta 11 > \epsilon 11$).

Meanwhile, when the width $\delta 12$ of the second axial gap is smaller than the width $\epsilon 11$ of the first radial gap, there is a risk that the adhesive having been drawn into the first radial gap (width $\epsilon 11$) is drawn also into the second axial gap (width $\delta 12$) by a capillary force. When the excessive adhesive is drawn into the second axial gap, there is a risk that the adhesive Q1 overflows from the second axial gap and intrudes into the thrust bearing gaps, whereby the bearing function of the thrust bearing portions T11 and T12 is impaired. In order to prevent the failures as described above, the width $\delta 12$ of the second axial gap is set to be larger than the width $\epsilon 11$ of the first radial gap ($\delta 12 > \epsilon 11$).

The fluid dynamic bearing device 21 assembled by the procedure described above is bonded to an inner peripheral surface $26a$ of the base member 26 in a gap-filling manner. Specifically, in the state in which adhesive is applied to the inner peripheral surface $26a$ of the base member 26 (alternatively to outer peripheral surface $30b3$ of cylindrical portion $30b$ or outer peripheral surface $29a12$ of thick portion $29a1$), an outer peripheral surface $30b3$ of the cylindrical portion $30b$ of the lid member 30 and an outer peripheral surface $29a12$ of the thick portion $29a1$ of the housing 29 are fitted to the inner peripheral surface $26a$ of the base member 26, and then the adhesive is cured. When the gap-filling bonding is performed, as illustrated in FIG. 13, the outer peripheral surface $30b3$ of the cylindrical portion $30b$ of the lid member 30 is loosely fitted to the inner peripheral surface $26a$ of the base member 26, and the second radial gap having the width $\epsilon 12$ is formed between the outer peripheral surface $30b3$ and the inner peripheral surface $26a$ of the base member 26. Further, the outer peripheral surface $29a12$ of the thick portion $29a1$ of the housing 29 is also loosely fitted to the inner peripheral surface $26a$ of the base member 26, and a third radial gap having a width $\epsilon 13$ is formed between the outer peripheral surface $29a12$ of the thick portion $29a1$ and the inner peripheral surface $26a$ of the base member 26. Both the second and third radial gaps $\epsilon 12$ and $\epsilon 13$ are represented by values obtained by deducting the radial dimension of the outer peripheral surface $30b3$ of the cylindrical portion $30b$ and the radial dimension of the outer peripheral surface $29a12$ of the thick portion $29a1$ from the radial dimension of the inner peripheral surface $26a$ of the base member 26, respectively.

The second radial gap (width $\epsilon 12$) is overlapped in the axial direction with part (part including at least pressure generating portion n1) or the entire of the lower radial dynamic pressure generating portion constituted by the dynamic pressure grooves $28a2$ and the hill portion.

In this structure, the width $\epsilon 12$ of the second radial gap is set to be larger than the width $\epsilon 13$ of the third radial gap ($\epsilon 12 > \epsilon 13$). With this, when being inserted along the inner periphery of the base member 26 from the lid member 30 side, the fluid dynamic bearing device 21 can be smoothly inserted because the outer peripheral surface $30b3$ of the lid member 30 serves as a guide. Further, more adhesive can be retained in the second radial gap (width $\epsilon 12$) to be eliminated by metal bonding, and hence a large bonding force can be obtained between the lid member 30 and the base member 26. When a large bonding force is obtained between the lid member 30 and the base member 26, it is possible to omit bonding between the outer peripheral surface $29a12$ of the housing 29 and the base member 26. The width $\epsilon 12$ of the second radial gap is larger than the width $\epsilon 11$ of the first radial gap ($\epsilon 12 > \epsilon 11$).

As illustrated in FIG. 13, in this embodiment, the inner peripheral surface of the base member 26 is uniform in diameter, and hence, based on the relationship $\epsilon 12 > \epsilon 13$, the outer peripheral surface $29a12$ of the thick portion $29a1$ of the housing 29 is larger in diameter than the outer peripheral surface $30b3$ of the lid member 30. On the premise that a diameter of the outer peripheral surface $29a12$ of the thick portion $29a1$ is $\Phi x1$ and a diameter of the outer peripheral surface $30b3$ of the lid member 30 is $\Phi y1$, it is desirable that a difference $z1$ between the radial dimension of the outer peripheral surface $29a12$, which is represented by $(\Phi x1 - \Phi y1)/2$, and the radial dimension of the outer peripheral surface $30b3$ be set to be larger than the width $\epsilon 11$ of the first radial gap ($z1 > \epsilon 11$). With this, even in the case where the lid member 30 is eccentrically bonded and fixed to the housing 29, when being inserted along the inner periphery of the base member 26 from the lid member 30 side, the fluid dynamic bearing device 21 can be smoothly inserted because the lid member 30 and the base member 26 do not interfere with each other.

Bonding of a resin and a metal is performed in both the first radial gap and the third radial gap, and hence a bonding force of the same extent is required. Therefore, the width $\epsilon 11$ of the first radial gap and the width $\epsilon 13$ of the third radial gap can be equalized to each other ($\epsilon 11 = \epsilon 13$).

Note that, in order to facilitate understanding, the widths $\delta 11$, $\delta 12$, $\epsilon 11$, $\epsilon 12$, and $\epsilon 13$ representing the axial gaps and the radial gaps in FIG. 13 are illustrated in an exaggerated manner.

When the motor assembled by the procedure described above is activated so as to rotate the shaft member 22, two radial bearing gaps are formed between the upper and lower radial dynamic pressure generating portions formed on the inner peripheral surface 28a of the bearing sleeve 28 and the outer peripheral surface of the shaft portion 22a opposed thereto. The pressure of the oil film in the radial bearing gaps is increased by the dynamic pressure grooves 28a1 and 28a2, whereby there are constituted a first radial bearing portion R11 and a second radial bearing portion R12 for supporting the shaft member 22 in a radial direction in a non-contact manner. Simultaneously, between the thrust dynamic pressure generating portion formed on the lower end surface 28c of the bearing sleeve 28 and the upper end surface 22b1 of the flange portion 22b, and between the thrust dynamic pressure generating portion formed on the upper end surface 30a1 of the plate portion 30a and the lower end surface 22b2 of the flange portion 22b, thrust bearing gaps are formed, respectively. The pressure of the oil film in the thrust bearing gaps is increased by the dynamic pressure grooves 28c1 and 30a11, whereby there are constituted the thrust bearing portions T11 and T12 for supporting the shaft member 22 in the thrust direction in a non-contact manner.

When the shaft member is rotated, owing to an imbalance of pumping capacities of the upper and lower radial dynamic pressure generating portions (refer to FIG. 10), the oil between the inner peripheral surface of the bearing sleeve 28 and the outer peripheral surface of the shaft portion 22a is pressed downward. Therefore, pressure tends to be increased in the space on the closed side inside the bearing, in particular, in the space on the radially inner side with respect to the lower thrust bearing gap (bottom surface space P1, refer to FIG. 14). In such a case, when the dynamic pressure grooves 30a11 of the second thrust bearing portion T12 on the lower side are provided in a spiral pattern of a pump-in type, which is frequently used in the conventional products, the oil in the thrust bearing gap is pressed to the radially inner side. As a result, an increase in pressure of a bottom surface space P1 is promoted. In order to avoid this, it is desirable that the dynamic pressure grooves 30a11 of the second thrust bearing portion T12 be provided in a herringbone pattern as described above (refer to FIG. 12). The problems of this type do not arise in the first thrust bearing portion T11 on the upper side, and hence the dynamic pressure grooves provided in the spiral pattern of a pump-in type may be adopted in place of the dynamic pressure grooves 28c1 provided in the herringbone pattern illustrated in FIG. 11.

Figure 14:
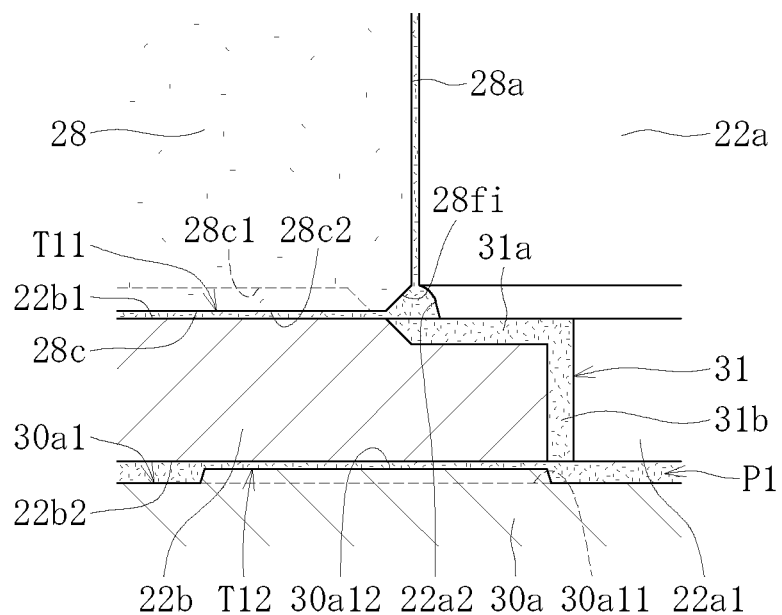
FIG. 14 is an enlarged sectional view of a main portion of the fluid dynamic bearing device illustrated in FIG. 9.

As illustrated in FIGS. 9 and 14, the shaft member 22 is provided with a communication hole 31 opened in the upper end surface 22b1 and the lower end surface 22b2 of the flange portion 22b. By providing the communication hole 31, a lubricating oil can be circulated between the upper and lower thrust bearing gaps through the communication hole 31. With this, a pressure balance (pressure balance at the time of activation of a motor, in particular) can be maintained between the upper thrust bearing gap and the lower thrust bearing gap.

As illustrated in FIG. 14, the communication hole 31 has a radial portion 31a and an axial portion 31b and has a bent shape so that the radial portion 31a and the axial portion 31b are opened, while respectively avoiding the dynamic pressure groove regions of both the thrust bearing portions T11 and T12, to the radially inner side with respect thereto. More specifically, the radially outer end of the radial portion 31a is opened to a space defined by the upper end surface 22b1 of the flange portion 22b, an inner peripheral chamfer 28fi of the bearing sleeve 28, and an escape portion 22a2 provided in the lower end portion of the shaft portion 22a. The axial portion 31b continuous with the radially inner end of the radial portion 31a extends to the outer peripheral surface of the small diameter portion 22a1 of the shaft portion 22a so as to be opened to the radially inner side of the thrust dynamic pressure generating portion of the second thrust bearing portion T12. An axial groove is formed in the inner peripheral surface of the flange portion 22b of a perforated-disk shape, and a radial groove communicated with the axial groove is formed in the upper end surface 22b1 of the flange portion 22b. After that, the small diameter portion 22a1 of the shaft portion 22a is fitted and fixed into the inner peripheral hole of the flange portion 22b. In this manner, it is possible to form the radial portion 31a in the radial groove, and to form the axial portion 31b in the axial groove. Note that, the communication hole 31 may be formed at a single point in a circumferential direction, or may be formed at multiple points.

The characteristics of the fluid dynamic bearing device 21 described above is enumerated as follows.

(1) The housing 29 is formed by injection molding (insert molding) together with the bearing sleeve 28 inserted therein. Therefore, it is possible to complete manufacturing of the housing 29 and fixation of the bearing sleeve 28 with respect to the housing 29 within one step. Further, merely by positioning the bearing sleeve with high accuracy within an injection molding die, it is possible to secure coaxiality of high accuracy between the bearing sleeve 28 and the housing 29. Accordingly, it is possible to achieve cost reduction of the fluid dynamic bearing device 21 while securing coaxiality.

(2) The lid member 30 is fixed to the outer peripheral surface of the housing 29, and hence, in comparison with the conventional cases of fixing the lid member 30 to the inner peripheral surface of the housing 29, a fixation area between both the members can be increased correspondingly to the radial difference between the inner peripheral surface and the outer peripheral surface. Further, by decreasing the axial length of the thick portion 29a1 of the housing 29, it is possible to increase the axial dimension of the cylindrical portion 30b of the lid member 30, thereby possible to easily achieve further increase in fixation area. In addition, it is unnecessary to increase the thickness of the lid member 30 in accordance therewith. Accordingly, retention strength of the lid member 30 can be increased without influence on the axial dimension of the bearing device 21 or the bearing spans of the radial bearing portions R11 and R12.

(3) Both the lid member 30 and the base member 26 are made of metal, and hence high bonding strength can be achieved between both the members. Accordingly, even when the housing 29 made of resin is used, it is possible to avoid lack of a bonding force between the housing 29 and the lid member 30, thereby possible to prevent the fluid dynamic bearing device 21 from falling off the base member 26 owing to an impact load or the like. Further, the lid member 30 is fixed not only to the housing 29 but also to the base member 26, and hence it is possible to prevent falling-off of the lid member 30 owing to an impact load.

(4) The lid member 30 is made of metal material, and hence static electricity charged to the head by the rotation of the disks D1 can be reliably discharged to the ground through a path constituted by the shaft member 22, the lid member 30, and the base member 26. In the case where the lid member 30 and the base member 26 are bonded and fixed to each other, in order to prevent the conductive path from being blocked by adhesive (normally, an insulant is used), when necessary, a paste-like conductive material is applied across the radially outer end of the lower end of the lid member 30 and the radially inner end of the lower end of the base member 26 (region A of FIG. 8) so as to form a conductive film. When the conductive path is constituted by the lid member 30 as described above, it is unnecessary to impart conductivity to the housing 29, and hence a range of choice of the material is expanded in considering a molding material of the housing, which leads to an increase in degree of freedom in designing a bearing device. In the case where conductivity is imparted to the housing 29 made of resin, an expensive conductive filler is normally mixed within the resin material as described above. However, in the present invention, it is possible to omit mixing of the conductive filler of this type or to reduce a mixing amount, thereby possible to reduce material cost.

(5) The lid member 30 is fixed to the outer periphery of the housing by gap-filling bonding, and hence, unlike the case of fixation by press-fitting, there does not arise the problem in which the inner peripheral surface of the bearing sleeve 28 is deformed on the radially inner side of the press-fit region so that the accuracy of the radial bearing gap is reduced. There is a risk that the inner peripheral surface of the bearing sleeve 28 is deformed similarly in the case where the outer peripheral surface 30$b$3 of the lid member 30 and the outer peripheral surface 29$a$12 of the thick portion 29$a$1 of the housing 29 are press-fitted to the inner peripheral surface 26$a$ of the base member 26. However, in the present invention, those outer peripheral surfaces 30$b$3 and 29$a$12 are bonded to the base member 26 in a gap-filling manner, and hence the problems of this type can be similarly avoided.

The present invention is not limited to the above-mentioned embodiment. In the following, another embodiment of the present invention is described. Note that, in the following description, the portions having same structures and functions as those in the above-mentioned embodiment are described while denoted by the same reference symbols, and description thereof is omitted.

Figure 15:
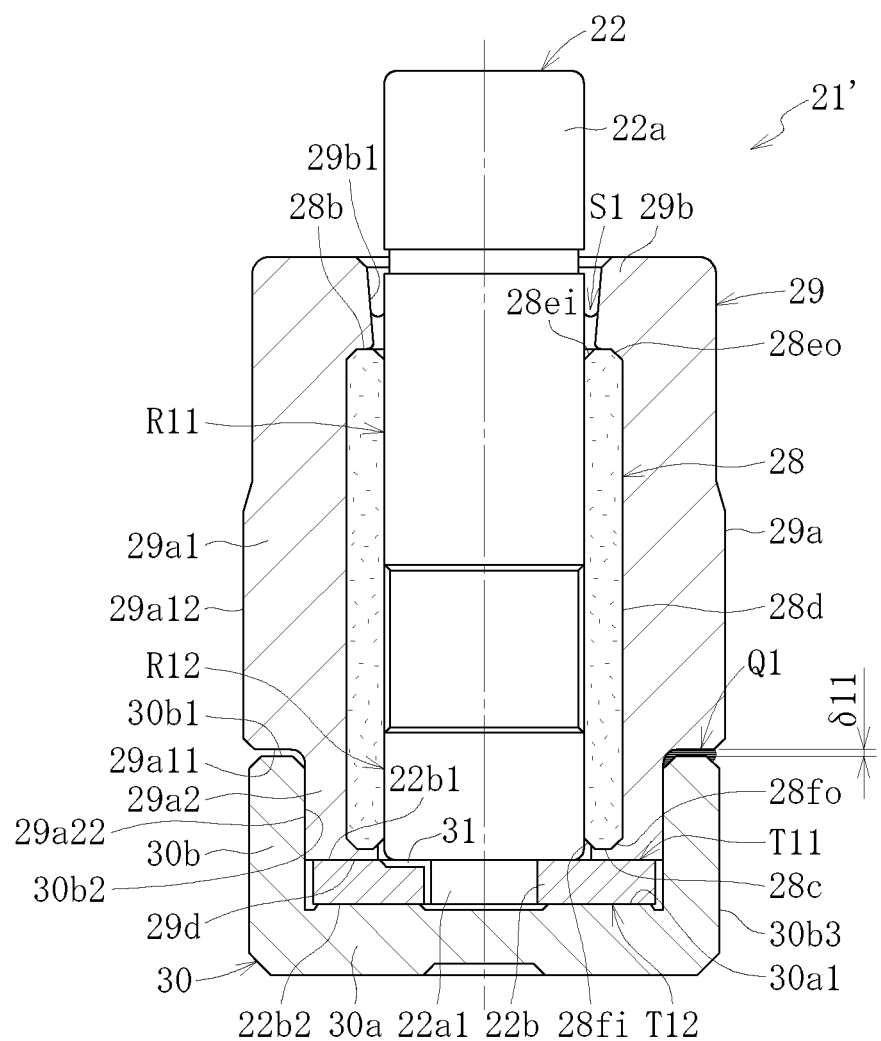
FIG. 15 is a sectional view of a fluid dynamic bearing device according to a fourth embodiment of the present invention.
Figure 17:
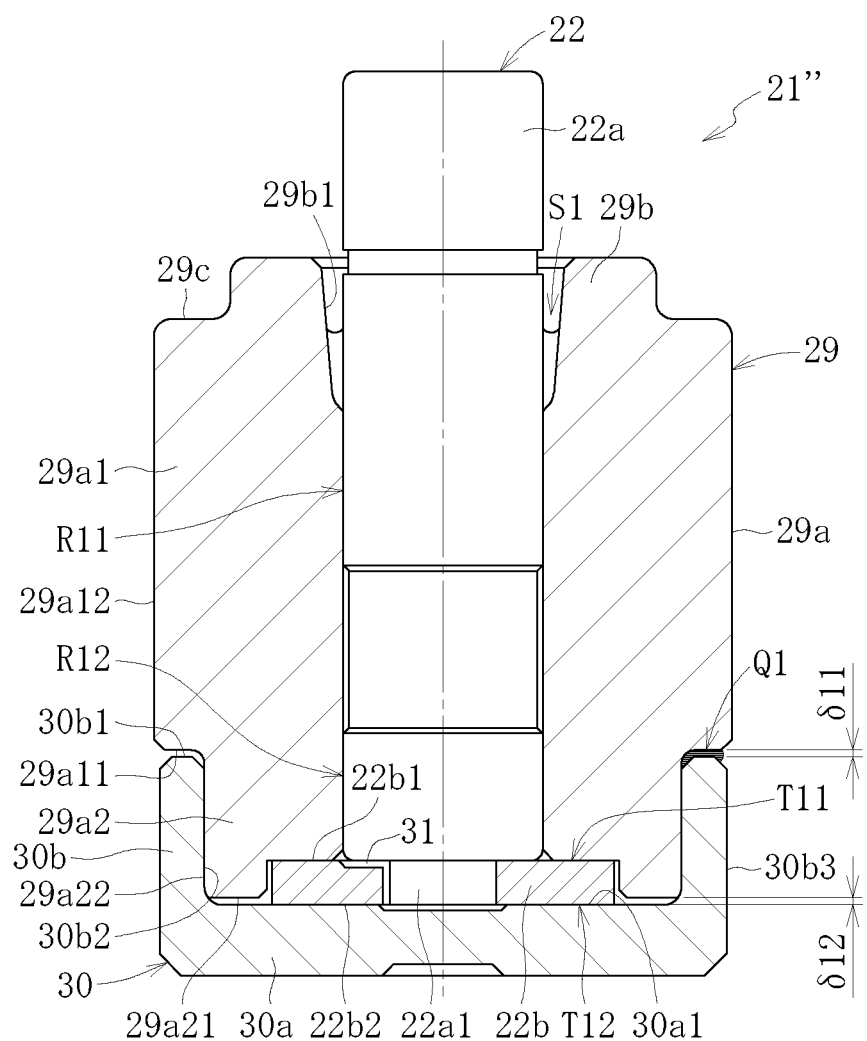
FIG. 17 is a sectional view of a fluid dynamic bearing device according to a fifth embodiment of the present invention.

Similarly to the fluid dynamic bearing device 21 illustrated in FIG. 9, in a fluid dynamic bearing device 21' illustrated in FIG. 15, the housing 29 is an injection-molded product of a resin in which the bearing sleeve 28 is inserted, and the metal lid member 30 is fixed to the outer peripheral surface of the housing 29, specifically, the outer peripheral surface of the thin portion 29$a$2. After the setting of the widths of the thrust bearing gaps the axial gap $\delta$11 is formed between the end surface 30$b$1 of the cylindrical portion 30$b$ of the lid member 30 and the end surface of the thick portion 29$a$1 of the housing 29.

In the fluid dynamic bearing device 21 illustrated in FIG. 9, the outer peripheral chamfer 28$fo$ on the lower end of the bearing sleeve 28 is covered with the housing 29 made of resin, and the lower end surface 28$c$ is not covered. In contrast, in the fluid dynamic bearing device 21' illustrated in FIG. 15, a cover portion 29$d$ extending toward a radially inner side is formed at the lower end of a thin portion 29$a$2 of the housing 29, the cover portion 29$d$ covers not only the outer peripheral chamfer 28$fo$ of the bearing sleeve 28 but also the entire of the lower end surface 28$c$ of the bearing sleeve 28. On the end surface of the cover portion 29$d$, there are formed a plurality of dynamic pressure grooves (dynamic pressure grooves of herringbone pattern illustrated in FIG. 12, for example) serving as the thrust dynamic pressure generating portion of the first thrust bearing portion T11. Note that, an inner peripheral chamfer 28$fi$ on the lower end of the bearing sleeve 28 is not covered with the cover portion 29$d$.

In this manner, by forming the thrust dynamic pressure generating portion to the cover portion 29$d$ of the housing 29, the thrust dynamic pressure generating portion formed in the lower end surface 28$c$ of the bearing sleeve 28 becomes unnecessary. Therefore, the radial thickness of the bearing sleeve 28 can be reduced compared with that in the embodiment illustrated in FIG. 9. Due to this reduction in thickness, it is possible to reduce the oil retaining amount in the bearing sleeve 28 made of sintered metal. Therefore, it is possible to reduce the oil retaining amount in the entire bearing device, and hence the thermal expansion amount of the oil at the time of temperature rise can be suppressed. Accordingly, volume of the seal space S1 can be reduced, and hence it is possible to reduce the axial dimension of the seal space S1, thereby possible to reduce the entire size of the bearing device.

Note that, the thrust dynamic pressure generating portion of the cover portion 29$d$ can be die-molded simultaneously with the injection molding of the housing 29 by forming a molding die corresponding to the thrust dynamic pressure generating portion to a die. Therefore, it is possible to omit a step of forming the thrust dynamic pressure generating portion, to thereby achieve the cost reduction.

By reducing the axial dimension of the seal space S1, the difference in thickness between the seal portion 29$b$ and the body portion 29$a$ in the housing 29 is reduced, and hence deformation at the time of mold shrinkage of the resin becomes less likely to occur. Therefore, in the fluid dynamic bearing device 21' according to this embodiment, a trimmed portion 29$c$ (refer to FIG. 9) formed on the upper-end outer diameter portion of the housing 29 is omitted.

Also in the embodiment illustrated in FIG. 15, the lid member 30 is bonded to the outer periphery of the housing 29 in a gap-filling manner, and the outer peripheral surface 30$b$3 of the lid member 30 is bonded to the inner peripheral surface 26$a$ of the base member 26 in a gap-filling manner (further, it is also possible to perform gap-filling bonding of outer peripheral surface 29$a$12 of thick portion 29$a$1 of housing 29 with respect to inner peripheral surface 26$a$ of base member 26). Similarly to the embodiment illustrated in FIG. 9, there are established relationships of $\delta11 > \epsilon11$, $\epsilon12 > \epsilon11$, $z1 > \epsilon11$, $\epsilon12 > \epsilon11$, and $\epsilon11 = \epsilon13$ between the first axial gap (width $\delta11$), the first radial gap (width $\epsilon11$), the second radial gap (width E12), and the third radial gap (width $\epsilon13$) excluding the second axial gap (width $\delta12$).

A fluid dynamic bearing device 21" illustrated in FIG. 16 is an example in which the bearing sleeve 28 of the fluid dynamic bearing device 21 illustrated in FIG. 9 is integrated with the housing 29 as one component. In this case, the integrated member constitutes the outer member 29. The outer member 29 can be manufactured by injection molding of the resin or the like. The outer member 29 has the thick portion 29$a$1 and the thin portion 29$a$2. In the two upper and lower regions of the inner peripheral surface of the outer member 29, the radial dynamic pressure generating portions of the shapes same as those illustrated in FIG. 10 are respectively formed, and the radial bearing gaps are formed between the radial dynamic pressure generating portions and the outer peripheral surface of the shaft member 22. Further, on the lower end surface of the outer member 29, the thrust dynamic pressure generating portion having the same shape as that illustrated in FIG. 11 is die-molded simultaneously with injection molding of the outer member, and the thrust bearing gap is formed between the thrust dynamic pressure generating portion and the upper end surface 22$b$1 of the flange portion 22$b$. Similarly to the embodiment illustrated in FIG. 9, the thrust bearing gap is also formed between the thrust dynamic pressure generating portion (refer to FIG. 12) formed in the upper end surface 30$a$1 of the plate portion 30$a$ and the lower end surface 22$b$2 of the flange portion 22$b$.

In this embodiment also, the lid member 30 is bonded to the outer periphery of the outer member 29 in a gap-filling manner, and the outer peripheral surface 30$b$3 of the lid member 30 is bonded to the inner peripheral surface 26$a$ of the base member 26 in a gap-filling manner (further, it is also possible to perform gap-filling bonding of outer peripheral surface 29a12 of thick portion 29a1 of housing 29 with respect to inner peripheral surface 26a of base member 26). In the fluid dynamic bearing device 21″, the following gaps are formed similarly to the embodiments illustrated in FIGS. 9 and 15.

The first radial gap between the inner peripheral surface 30b2 of the cylindrical portion 30b of the lid member 30 and the outer peripheral surface 29a22 of the thin portion 29a2 of the outer member 29 (width ϵ11)

The first axial gap between the end surface 30b1 of the cylindrical portion 30b of the lid member 30 and the end surface 29a11, which faces the end surface, of the thick portion 29a1 of the outer member 29 (width δ11)

The second axial gap between the plate portion 30a of the lid member 30 and the end surface 29a21, which faces the plate portion, of the thin portion 29a2 of the outer member 29 (width δ12)

The second radial gap between the outer peripheral surface 30b3 of the cylindrical portion 30b of the lid member 30 and the inner peripheral surface 26a of the base member 26 (width ϵ12)

The third radial gap between the outer peripheral surface 29a12 of the thick portion 29a1 of the outer member 29 and the inner peripheral surface 26a of the base member 26 (width ϵ13)

Further, similarly to the embodiment illustrated in FIG. 9, relationships of δ11>ϵ11, ϵ12>ϵ11, ϵ12>ϵ13, z1>ϵ11, ϵ12>ϵ11, and ϵ11=ϵ13 are formed between the gaps.

In the above-mentioned embodiments, a resin is used as an injection material of the housing (outer member) 29. However, the injection material is not limited thereto, and it is possible to perform injection molding using a low-melting metal material such as a magnesium alloy and an aluminum alloy. Further, in addition to injection molding of the housing while inserting the bearing sleeve thereinto, it is also possible, if there is no problem with cost, to fix the bearing sleeve 28 to the inner periphery of the housing 29 by means such as bonding after separately manufacturing the bearing sleeve 28 and the housing 29 with use of a metal material or a resin material.

Further, in the above-mentioned embodiments, when the lid member 30 is fixed to the bearing sleeve 28, the adhesive is applied in advance to the thin portion 29a2 of the housing (outer member) 29 and the cylindrical portion 30b of the lid member 30, and then the lid member 30 is fitted to the thin portion 29a2 of the housing 29. However, this should not be construed restrictively. For example, it is also possible to perform bonding and fixation of both the members by, after fitting the lid member 30 and the housing 29 to each other in advance and setting the widths of the thrust bearing gaps, supplying the adhesive from the axial gap δ11 and drawing the adhesive by the capillary force into a minute gap between the inner peripheral surface of the cylindrical portion 30b and the outer peripheral surface of the thin portion 29a2.

Further, in the above-mentioned embodiments, the dynamic pressure generating portions of the radial bearing portions R11 and R12, and the thrust bearing portions T11 and T12 are respectively formed in the inner peripheral surface 28a and the lower end surface 28c of the bearing sleeve 28, and the upper end surface 30a1 of the plate portion 30a of the lid member 30. However, it is also possible to form them on the surfaces facing these surfaces through an intermediation of the bearing gaps, that is, the outer peripheral surface of the shaft portion 22a, the upper end surface 22b1 or the lower end surface 22b2 of the flange portion 22b.

Further, in the above-mentioned embodiments, there is exemplified a case of forming the dynamic pressure grooves in a herringbone pattern as the radial dynamic pressure generating portions of the radial bearing portions R11 and R12. However, this should not be construed restrictively. For example, it is also possible to adopt a so-called step bearing, a corrugated bearing, or a multirobe bearing. Further, it is also possible to adopt as the radial bearing portions R11 and R12 a so-called cylindrical bearing in which two surfaces facing each other through an intermediation of the radial bearing gaps are formed as cylindrical surfaces. In this case, there are not provided the dynamic pressure generating portion for making the fluid film in the radial bearing gaps to positively generate the dynamic pressure effect. However, at the time of rotation of the shaft member, the dynamic pressure effect is generated in the fluid film due to viscosity of the lubrication fluid to form the radial bearing portions R11 and R12.

Further, in the above-mentioned embodiments, there is exemplified a case of using the dynamic pressure grooves as the thrust dynamic pressure generating portions of the thrust bearing portions T11 and T12. However, this should not be construed restrictively. For example, it is also possible to adopt the structure of the step bearing or the corrugated bearing. Alternatively, in place of the thrust bearing portions T11 and T12 constituted with the dynamic pressure bearing, it is also possible to constitute the thrust bearing portions by a pivot bearing contact-supporting the end portion of the shaft member 22 with the upper end surface 30a1 of the plate portion 30a of the lid member 30.

Further, while in the above-mentioned embodiments the radial bearing portions R1 and R2 are axially spaced apart from each other, they may also be provided so as to be continuous with each other in the axial direction. Alternatively, it is also possible to provide only one of these radial bearing portions.

The invention claimed is:

1. A fluid dynamic bearing device, comprising:
   a shaft member;
   a bearing sleeve which forms a radial bearing gap with an outer peripheral surface of the shaft member and which includes an outer peripheral chamfer on a first end thereof, in an axial direction;
   a housing which accommodates the bearing sleeve and which is opened at a first end thereof and a second end thereof, in the axial direction; and
   a lid member which closes an opening on the first end of the housing and forms a thrust bearing portion,
   wherein the housing is an injection-molded product into which the bearing sleeve is inserted;
   wherein the housing includes an integrally formed chamfer covering portion, on the first end of the housing, which covers the outer peripheral chamfer of the first end of the bearing sleeve, such that the integrally formed chamfer covering portion is at least partially disposed between the outer peripheral chamfer of the first end of the bearing sleeve and the lid member, in the axial direction;
   wherein the housing includes an integrally formed seal portion, on the second end of the housing, which covers an end surface on a second end of the bearing sleeve, the integrally formed seal portion forming a seal space between the housing and the shaft member; and
   wherein the lid member is fixed to an outer peripheral surface of the housing.

2. A fluid dynamic bearing device according to claim 1, wherein,
   the lid member and the housing are made of materials different from each other.

3. A fluid dynamic bearing device according to claim 1 or 2, wherein conductivity of the lid member is made higher than conductivity of the housing.

4. A fluid dynamic bearing device according to claim 1 or 2, wherein an end surface on the first end of the bearing sleeve is also covered by the housing.

5. A fluid dynamic bearing device according to claim 4, wherein a thrust dynamic pressure generating portion is formed on an end surface of the housing which covers the end surface on the first end of the bearing sleeve.

6. A fluid dynamic bearing device according to claim 1 or 2, wherein the lid member is a press-molded product.

7. A fluid dynamic bearing device according to claim 1 or 2,
wherein a flange portion is provided to the shaft member; and
wherein thrust bearing gaps are formed respectively between an end surface on the first end of the bearing sleeve and a first end surface of the flange portion, and between the lid member and a second end surface of the flange portion.

8. A fluid dynamic bearing device according to claim 7, wherein axial gaps allowing an axially-approaching movement of the housing and the lid member until both the thrust bearing gaps are eliminated are interposed between the housing and the lid member.

9. A fluid dynamic bearing device according to claim 7, wherein the flange portion has a communication hole opened in both the first end surface and the second end surface thereof.

10. A fluid dynamic bearing device according to claim 1, wherein the housing and the bearing sleeve are integrally formed together by insert molding.

* * * * *